United States Patent
Yan

(10) Patent No.: US 11,943,492 B2
(45) Date of Patent: Mar. 26, 2024

(54) METHOD AND SYSTEM FOR ADDING SUBTITLES AND/OR AUDIO

(71) Applicant: Petal Cloud Technology Co., Ltd., Dongguan (CN)

(72) Inventor: Wei Yan, Nanjing (CN)

(73) Assignee: PETAL CLOUD TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/005,769

(22) PCT Filed: Jul. 13, 2021

(86) PCT No.: PCT/CN2021/105994
§ 371 (c)(1),
(2) Date: Jan. 17, 2023

(87) PCT Pub. No.: WO2022/012521
PCT Pub. Date: Jan. 20, 2022

(65) Prior Publication Data
US 2023/0283815 A1 Sep. 7, 2023

(30) Foreign Application Priority Data
Jul. 14, 2020 (CN) .......................... 202010677344.1

(51) Int. Cl.
*H04N 21/235* (2011.01)
*H04N 21/81* (2011.01)
*H04N 21/858* (2011.01)

(52) U.S. Cl.
CPC ..... *H04N 21/2355* (2013.01); *H04N 21/8106* (2013.01); *H04N 21/8586* (2013.01)

(58) Field of Classification Search
CPC ........... H04N 21/2355; H04N 21/8106; H04N 21/8586; H04N 21/23109; H04N 21/2353; H04N 21/4884; H04N 21/2335; H04N 21/8133; H04N 21/234309; H04N 21/8455; G06F 16/61
See application file for complete search history.

(56) References Cited

U.S. PATENT DOCUMENTS

| | | | | |
|---|---|---|---|---|
| 2012/0035907 | A1* | 2/2012 | Lebeau | G10L 13/00 704/235 |
| 2018/0376218 | A1* | 12/2018 | Wu | H04N 21/4183 |
| 2019/0364303 | A1* | 11/2019 | Zhu | H04N 21/2368 |
| 2020/0007946 | A1* | 1/2020 | Olkha | G06F 40/263 |
| 2020/0068232 | A1* | 2/2020 | Lipczynski | H04N 21/25883 |
| 2020/0314460 | A1* | 10/2020 | Hu | H04N 21/2368 |
| 2021/0073526 | A1* | 3/2021 | Zeng | G06V 20/41 |

* cited by examiner

*Primary Examiner* — Oschta I Montoya
(74) *Attorney, Agent, or Firm* — Conley Rose, P.C.

(57) ABSTRACT

A method includes that a media asset server receives an identifier and a new-language file of a target video and converts the new-language file into a new-language medium file. The media asset server finds a first index file based on the identifier of the target video, and obtains a second index file based on a storage address of the new-language medium file on the media asset server. The media asset server sends the new-language medium file and the second index file to a content delivery server. The content delivery server replaces the storage address of the new-language medium file on the media asset server in the second index file with a storage address of the new-language medium file on the content delivery server to obtain a third index file. The content delivery server generates a first URL of the target video.

18 Claims, 13 Drawing Sheets

METHOD AND SYSTEM FOR ADDING SUBTITLES AND/OR AUDIO

CROSS-REFERENCE TO RELATED APPLICATIONS

This is a U.S. National Stage of International Patent Application No. PCT/CN2021/105994 filed on Jul. 13, 2021, which claims priority to Chinese Patent Application No. 202010677344.1 filed on Jul. 14, 2020. Both of the aforementioned applications are hereby incorporated by reference in their entireties.

TECHNICAL FIELD

This application relates to the field of video processing technologies, and in particular, to a method and a system for adding subtitles and/or audio.

BACKGROUND

Due to copyright, costs, multilingual production plans, and the like, a video operator brings online only subtitles and audio in a required language when a video goes online. For example, when introducing content of a video, the video operator introduces only subtitles and audio in a language of a country in which the video operator operates, to reduce content introduction costs. Alternatively, a video producer first produces subtitles and audio in one language, and produces subtitles and audio in other languages later as copyright is sold in foreign countries and regions.

When the video operator wants to add new-language subtitles or new-language audio to a video after the video goes online, the video operator needs to first discontinue content (a video stream, existing-language subtitles, and existing-language audio) of the video, and then retranscode all content (the video stream, existing-language subtitles, existing-language audio, and new-language subtitles or new-language audio) of the video and release the video again, or use an independent subtitle server to provide multilingual subtitle services.

If the video operator discontinues the video, and then retranscodes all content of the video and releases the video again, the show of the video is affected, costs are increased, and resource consumption is high. If the video operator uses the independent subtitle server to provide the multilingual subtitle services, operations and maintenance costs are increased.

SUMMARY

This application provides a method and a system for adding subtitles and/or audio. To add new-language subtitles or new-language audio of a video, it is only necessary to convert the new-language subtitles or new-language audio of the video into a medium format that can be recognized and played by a player and release the medium format. In this way, costs are greatly reduced and operation efficiency is improved.

According to a first aspect, this application provides a system for adding multilingual subtitles and audio. The system includes a media asset server and a content delivery server. The media asset server is configured to receive an identifier and a new-language file of a target video. The new-language file includes to-be-added subtitles of the target video and/or to-be-added audio of the target video. The media asset server is further configured to obtain a first index file of the target video based on the identifier of the target video. The first index file includes a uniform resource locator (URL) of an existing-language medium file of the target video. The URL of the existing-language medium file is used to indicate a storage address of the existing-language medium file on the media asset server. The media asset server is further configured to perform format conversion on the new-language file to obtain a new-language medium file. The media asset server is further configured to add a first URL of the new-language medium file to the first index file to obtain a second index file. The first URL of the new-language medium file is used to indicate a storage address of the new-language medium file on the media asset server. The media asset server is further configured to send the new-language medium file and the second index file to the content delivery server. The content delivery server is configured to send a third index file to a terminal. The third index file is obtained by the content delivery server based on the second index file and a second URL of the new-language medium file. The second URL of the new-language medium file is used to indicate a storage address of the new-language medium file on the content delivery server.

New-language subtitles of the target video may also be referred to as the to-be-added subtitles of the target video. New-language audio of the target video may also be referred to as the to-be-added audio of the target video.

The existing-language medium file includes a video stream medium file, and an existing-language subtitle medium file and/or an existing-language audio medium file of the target video.

The new-language subtitles are subtitles corresponding to a new language added on the basis of existing-language subtitles of the target video. The new-language audio is audio corresponding to the new language added on the basis of existing-language audio of the target video.

The new-language subtitles of the target video and/or the new-language audio of the target video are referred to as the new-language file.

This application provides the system for adding subtitles and/or audio. The system includes the media asset server and the content delivery server. The media asset server receives the identifier and the new-language file of the target video uploaded by a user and converts the new-language file into the new-language medium file. The media asset server finds the first index file based on the identifier of the target video, and obtains the second index file based on the storage address of the new-language medium file on the media asset server. The media asset server sends the new-language medium file and the second index file to the content delivery server. The content delivery server replaces the storage address of the new-language medium file on the media asset server in the second index file with the storage address of the new-language medium file on the content delivery server to obtain the third index file. The content delivery server generates a first URL of the target video. In the method, to add the new-language subtitles or new-language audio of the target video, it is only necessary to transcode and release the new-language subtitles or new-language audio of the target video. In this way, costs are greatly reduced and operation efficiency is improved.

With reference to the first aspect, in a possible implementation of the first aspect, the media asset server is further configured to send the new-language file to a transcoding server. The media asset server receives the new-language medium file obtained after the transcoding server transcodes the new-language file. The transcoding server performs format conversion on the new-language file of the target video to obtain the new-language medium file of the target video. In this way, file format conversion efficiency can be improved.

With reference to the first aspect, in a possible implementation of the first aspect, the media asset server is further configured to receive the first URL of the target video sent by the content delivery server. The first URL of the target video is used to indicate a storage address of the third index file on the content delivery server. The media asset server sends the identifier of the target video and the first URL of the target video to a content management server. The identifier of the target video is used by the content management server to obtain first metadata information of the target video. The first metadata information includes a second URL of the target video. The second URL of the target video is used to indicate a storage address of the first index file on the content delivery server. The first URL of the target video is used by the content management server to replace the second URL of the target video in the first metadata information with the first URL of the target video to obtain second metadata information. The content management server updates the metadata information of the target video, so that when the terminal requests to play the target video, the content management server can provide the first URL of the target video to the terminal, and the terminal can obtain the third index file from the content delivery server based on the first URL of the target video.

With reference to the first aspect, in a possible implementation of the first aspect, the content delivery server is further configured to: before sending the third index file to the terminal, receive a first obtaining request sent by the terminal for the first URL of the target video. The content delivery server sends the third index file to the terminal in response to the first obtaining request. Before sending the third index file to the terminal, the content delivery server receives the first obtaining request sent by the terminal for the first URL of the target video. The first obtaining request is used by the content delivery server to obtain the third index file of the target video based on the first URL of the target video. Then, the content delivery server sends the third index file of the target video to the terminal. The terminal can obtain a corresponding medium file based on a URL of each medium file in the third index file. The terminal selects, based on a network bandwidth situation, an appropriate medium file to play the target video. This avoids frame freezing due to poor network quality when the terminal plays the target video, which affects viewing experience.

With reference to the first aspect, in a possible implementation of the first aspect, the content delivery server is further configured to: after sending the third index file to the terminal, receive a second obtaining request sent by the terminal based on the second URL of the new-language medium file in the third index file; and send the new-language medium file to the terminal in response to the second obtaining request.

After sending the third index file to the terminal, the content delivery server receives the second obtaining request sent by the terminal based on a download URL of a second-language subtitle medium file or a download URL of a second-language audio medium file in the third index file. The second obtaining request is used by the content delivery server to obtain the second-language subtitle medium file based on the download URL of the second-language subtitle medium file or obtain the second-language audio medium file based on the download URL of the second-language audio medium file. That is, the second obtaining request is used to switch to subtitles or audio in another language. In this way, the terminal can provide the user with a function of switching to audio or subtitles in another language based on a video viewing habit of the user, to bring better viewing experience to the user.

With reference to the first aspect, in a possible implementation of the first aspect, the first index file further includes an identifier of the new-language medium file and an encoding format of the new-language medium file.

According to a second aspect, this application provides a media asset server, including a processor and a memory. The memory is coupled to the processor. The memory is configured to store computer program code. The computer program code includes computer instructions. The processor invokes the computer instructions to enable the media asset server to: receive an identifier and a new-language file of a target video, where the new-language file includes to-be-added subtitles of the target video and/or to-be-added audio of the target video; obtain a first index file of the target video based on the identifier of the target video, where the first index file includes a uniform resource locator (URL) of an existing-language medium file of the target video, and the URL of the existing-language medium file is used to indicate a storage address of the existing-language medium file on the media asset server.

The media asset server performs format conversion on the new-language file to obtain a new-language medium file. The media asset server adds a first URL of the new-language medium file to the first index file to obtain a second index file, where the first URL of the new-language medium file is used to indicate a storage address of the new-language medium file on the media asset server. The media asset server sends the new-language medium file and the second index file to a content delivery server.

This application provides the media asset server, including the processor and the memory. The memory is coupled to the processor. The memory is configured to store the computer program code. The computer program code includes the computer instructions. The processor invokes the computer instructions to enable the media asset server to: receive the identifier and the new-language file of the target video uploaded by a user and convert the new-language file into the new-language medium file; find the first index file based on the identifier of the target video, and obtain the second index file based on the storage address of the new-language medium file on the media asset server; and send the new-language medium file and the second index file to the content delivery server. In the method, to add new-language subtitles or new-language audio of the target video, it is only necessary to transcode and release the new-language subtitles or new-language audio of the target video. In this way, costs are greatly reduced and operation efficiency is improved.

With reference to the second aspect, in a possible implementation of the second aspect, the processor is further configured to invoke the computer instructions to enable the media asset server to send the new-language file to a transcoding server; and receive the new-language medium file obtained after the transcoding server transcodes the new-language file. The transcoding server performs format conversion on the new-language file of the target video to obtain the new-language medium file of the target video. In this way, file format conversion efficiency can be improved.

With reference to the second aspect, in a possible implementation of the second aspect, the processor is further configured to invoke the computer instructions to enable the media asset server to send the first index file to a transcoding server; and receive the second index file sent by the transcoding server, where the second index file is obtained after the transcoding server adds the first URL of the new-language medium file to the first index file. In this way, the transcoding server adds the first URL of the new-language medium file to the first index file to obtain the second index file. The transcoding server sends the second index file and the new-language medium file to the media asset server. The media asset server directly replaces the first index file with the second index file.

Alternatively, the media asset server does not need to send the first index file to the transcoding server, and the media asset server updates the first index file to obtain the second index file. This can reduce file transmission between the media asset server and the transcoding server and reduce network transmission resources.

With reference to the second aspect, in a possible implementation of the second aspect, the processor is further configured to invoke the computer instructions to enable the media asset server to receive a third index file sent by the content delivery server. The third index file is obtained by the content delivery server based on the second index file and a second URL of the new-language medium file. The second URL of the new-language medium file is used to indicate a storage address of the new-language medium file on the content delivery server. The content delivery server replaces the first URL of the new-language medium file in the second index file with the second URL of the new-language medium file. In this way, when receiving a second obtaining request sent by a terminal based on the second URL of the new-language medium file in the third index file, the content delivery server can find the corresponding new-language medium file on the content delivery server based on the second URL of the new-language medium file. The content delivery server does not need to obtain the new-language medium file from the media asset server based on the first URL of the new-language medium file, so that file obtaining efficiency can be improved.

With reference to the second aspect, in a possible implementation of the second aspect, the processor is further configured to invoke the computer instructions to enable the media asset server to receive a first URL of the target video sent by the content delivery server, where the first URL of the target video is used to indicate a storage address of the third index file on the content delivery server; and send the identifier of the target video and the first URL of the target video to a content management server. The identifier of the target video is used by the content management server to obtain first metadata information of the target video. The first metadata information includes a second URL of the target video. The second URL of the target video is used to indicate a storage address of the first index file on the content delivery server. The first URL of the target video is used by the content management server to replace the second URL of the target video in the first metadata information with the first URL of the target video to obtain second metadata information. The content management server updates the metadata information of the target video, so that when the terminal requests to play the target video, the content management server can provide the first URL of the target video to the terminal, and the terminal can obtain the third index file from the content delivery server based on the first URL of the target video.

With reference to the second aspect, in a possible implementation of the second aspect, the first index file further includes an identifier of the new-language medium file and an encoding format of the new-language medium file.

According to a third aspect, this application provides a method for adding subtitles and/or audio. The method includes: A media asset server receives an identifier and a new-language file of a target video. The new-language file includes to-be-added subtitles of the target video and/or to-be-added audio of the target video. The media asset server obtains a first index file of the target video based on the identifier of the target video. The first index file includes a uniform resource locator (URL) of an existing-language medium file of the target video. The URL of the existing-language medium file is used to indicate a storage address of the existing-language medium file on the media asset server. The media asset server performs format conversion on the new-language file to obtain a new-language medium file. The media asset server adds a first URL of the new-language medium file to the first index file to obtain a second index file. The first URL of the new-language medium file is used to indicate a storage address of the new-language medium file on the media asset server.

The media asset server sends the new-language medium file and the second index file to a content delivery server. The content delivery server sends a third index file to a terminal. The third index file is obtained by the content delivery server based on the second index file and a second URL of the new-language medium file. The second URL of the new-language medium file is used to indicate a storage address of the new-language medium file on the content delivery server.

This application provides the method for adding subtitles and/or audio. The method includes the media asset server and the content delivery server. The media asset server receives the identifier and the new-language file of the target video uploaded by a user and converts the new-language file into the new-language medium file. The media asset server finds the first index file based on the identifier of the target video, and obtains the second index file based on the storage address of the new-language medium file on the media asset server. The media asset server sends the new-language medium file and the second index file to the content delivery server. The content delivery server replaces the storage address of the new-language medium file on the media asset server in the second index file with the storage address of the new-language medium file on the content delivery server to obtain the third index file. The content delivery server generates a first URL of the target video. In the method, to add new-language subtitles or new-language audio of the target video, it is only necessary to transcode and release the new-language subtitles or new-language audio of the target video. In this way, costs are greatly reduced and operation efficiency is improved.

With reference to the third aspect, in a possible implementation of the third aspect, that the media asset server performs format conversion on an appended file to obtain an appended medium file specifically includes: The media asset server sends the appended file to a transcoding server. The media asset server receives the appended medium file obtained after the transcoding server transcodes the appended file. The transcoding server performs format conversion on the new-language file of the target video to obtain the new-language medium file of the target video. In this way, file format conversion efficiency can be improved.

With reference to the third aspect, in a possible implementation of the third aspect, the media asset server receives the first URL of the target video sent by the content delivery server. The first URL of the target video is used to indicate a storage address of the third index file on the content delivery server. The media asset server sends the identifier of the target video and the first URL of the target video to a content management server. The identifier of the target video is used by the content management server to obtain first metadata information of the target video. The first metadata information includes a second URL of the target video. The second URL of the target video is used to indicate a storage address of the first index file on the content delivery server. The first URL of the target video is used by the content management server to replace the second URL of the target video in the first metadata information with the first URL of the target video to obtain second metadata information. The content management server updates the metadata information of the target video, so that when the terminal requests to play the target video, the content management server can provide the first URL of the target video to the terminal, and the terminal can obtain the third index file from the content delivery server based on the first URL of the target video.

With reference to the third aspect, in a possible implementation of the third aspect, the content delivery server receives a first obtaining request of the terminal for the first URL of the target video. The content delivery server sends the third index file to the terminal in response to the first obtaining request. Before sending the third index file to the terminal, the content delivery server receives the first obtaining request sent by the terminal for the first URL of the target video. The first obtaining request is used by the content delivery server to obtain the third index file of the target video based on the first URL of the target video. Then, the content delivery server sends the third index file of the target video to the terminal. The terminal can obtain a corresponding medium file based on a URL of each medium file in the third index file. The terminal selects, based on a network bandwidth situation, an appropriate medium file to play the target video. This avoids frame freezing due to poor network quality when the terminal plays the target video, which affects viewing experience.

With reference to the third aspect, in a possible implementation of the third aspect, the content delivery server receives a second obtaining request sent by the terminal based on the second URL of the new-language medium file in the third index file. The content delivery server sends the new-language medium file to the terminal in response to the second obtaining request. After sending the third index file to the terminal, the content delivery server receives the second obtaining request sent by the terminal based on a download URL of a second-language subtitle medium file or a download URL of a second-language audio medium file in the third index file. The second obtaining request is used by the content delivery server to obtain the second-language subtitle medium file based on the download URL of the second-language subtitle medium file or obtain the second-language audio medium file based on the download URL of the second-language audio medium file. That is, the second obtaining request is used to switch to subtitles or audio in another language. In this way, the terminal can provide the user with a function of switching to audio or subtitles in another language based on a video viewing habit of the user, to bring better viewing experience to the user.

With reference to the third aspect, in a possible implementation of the third aspect, the first index file further includes an identifier of the new-language medium file and an encoding format of the new-language medium file.

According to a fourth aspect, this application provides another method for adding subtitles and/or audio. The method includes: A media asset server receives an identifier and a new-language file of a target video. The new-language file includes to-be-added subtitles of the target video and/or to-be-added audio of the target video. The media asset server obtains a first index file of the target video based on the identifier of the target video. The first index file includes a uniform resource locator (URL) of an existing-language medium file of the target video. The URL of the existing-language medium file is used to indicate a storage address of the existing-language medium file on the media asset server. The media asset server performs format conversion on the new-language file to obtain a new-language medium file. The media asset server adds a first URL of the new-language medium file to the first index file to obtain a second index file. The first URL of the new-language medium file is used to indicate a storage address of the new-language medium file on the media asset server. The media asset server sends the new-language medium file and the second index file to a content delivery server.

This application provides the method for adding subtitles and/or audio. The media asset server receives the identifier and the new-language file of the target video uploaded by a user and converts the new-language file into the new-language medium file. The media asset server finds the first index file based on the identifier of the target video, and obtains the second index file based on the storage address of the new-language medium file on the media asset server. The media asset server sends the new-language medium file and the second index file to the content delivery server. In the method, to add new-language subtitles or new-language audio of the target video, it is only necessary to transcode and release the new-language subtitles or new-language audio of the target video. In this way, costs are greatly reduced and operation efficiency is improved.

With reference to the fourth aspect, in a possible implementation of the fourth aspect, the media asset server sends the new-language file to a transcoding server. The media asset server receives the new-language medium file obtained after the transcoding server transcodes the new-language file. The transcoding server performs format conversion on the new-language file of the target video to obtain the new-language medium file of the target video. In this way, file format conversion efficiency can be improved.

With reference to the fourth aspect, in a possible implementation of the fourth aspect, the media asset server sends the first index file to a transcoding server. The media asset server receives the second index file sent by the transcoding server. The second index file is obtained after the transcoding server adds the first URL of the new-language medium file to the first index file. The transcoding server adds the first URL of the new-language medium file to the first index file to obtain the second index file. The transcoding server sends the second index file and the new-language medium file to the media asset server. The media asset server directly replaces the first index file with the second index file.

Alternatively, the media asset server does not need to send the first index file to the transcoding server, and the media asset server updates the first index file to obtain the second index file. This can reduce file transmission between the media asset server and the transcoding server and reduce network transmission resources.

With reference to the fourth aspect, in a possible implementation of the fourth aspect, the media asset server receives a third index file sent by the content delivery server. The third index file is obtained by the content delivery server based on the second index file and a second URL of the new-language medium file. The second URL of the new-language medium file is used to indicate a storage address of the new-language medium file on the content delivery server. The content delivery server replaces the first URL of the new-language medium file in the second index file with the second URL of the new-language medium file. In this way, when receiving a second obtaining request sent by a terminal based on the second URL of the new-language medium file in the third index file, the content delivery server can find the corresponding new-language medium file on the content delivery server based on the second URL of the new-language medium file. The content delivery server does not need to obtain the new-language medium file from the media asset server based on the first URL of the new-language medium file, so that file obtaining efficiency can be improved.

With reference to the fourth aspect, in a possible implementation of the fourth aspect, the media asset server receives the first URL of the target video sent by the content delivery server. The first URL of the target video is used to indicate a storage address of the third index file on the content delivery server. The media asset server sends the identifier of the target video and the first URL of the target video to a content management server. The identifier of the target video is used by the content management server to obtain first metadata information of the target video. The first metadata information includes a second URL of the target video. The second URL of the target video is used to indicate a storage address of the first index file on the content delivery server. The first URL of the target video is used by the content management server to replace the second URL of the target video in the first metadata information with the first URL of the target video to obtain second metadata information. The content management server updates the metadata information of the target video, so that when the terminal requests to play the target video, the content management server can provide the first URL of the target video to the terminal, and the terminal can obtain the third index file from the content delivery server based on the first URL of the target video.

With reference to the fourth aspect, in a possible implementation of the fourth aspect, the first index file further includes an identifier of the new-language medium file and an encoding format of the new-language medium file.

According to a fifth aspect, an embodiment of this application provides a computer storage medium. The computer-readable storage medium stores a computer program. When the computer program is executed by a processor, the processor performs the method for adding subtitles and/or audio according to the fourth aspect and any one implementation of the fourth aspect.

According to a sixth aspect, an embodiment of this application provides a computer program product. A computer-readable storage medium stores a computer program. When the computer program is executed by a processor, the processor performs the method for adding subtitles and/or audio according to the fourth aspect and any one implementation of the fourth aspect.

In the method, to add new-language subtitles or new-language audio of a video, it is only necessary to convert the new-language subtitles or new-language audio of the video into a medium format that can be recognized and played by a player and release the medium format. A video stream, subtitles in all languages, and audio in all languages of the video do not need to be retranscoded and then released. In this way, costs are greatly reduced and operation efficiency is improved.

DESCRIPTION OF EMBODIMENTS

The following clearly describes technical solutions in embodiments of this application in detail with reference to accompanying drawings. In descriptions of embodiments of this application, unless otherwise stated. "/" indicates "or". For example, A/B may indicate A or B. The term "or" in this specification merely describes an association relationship for describing associated objects, and indicates that three relationships may exist. For example, "A or B" may indicate the following three cases: Only A exists, both A and B exist, and only B exists. In addition, in the descriptions of embodiments of this application, "a plurality of" means two or more.

The terms "first" and "second" mentioned below are merely intended for description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

Next, the following describes a hardware architecture of a terminal 330 in embodiments of this application.

The terminal 330 may be a device such as a smartphone, a tablet computer, a Bluetooth watch, or a Bluetooth headset. Embodiments of this application are described in detail herein by using the smartphone as an example.

Figure 1:
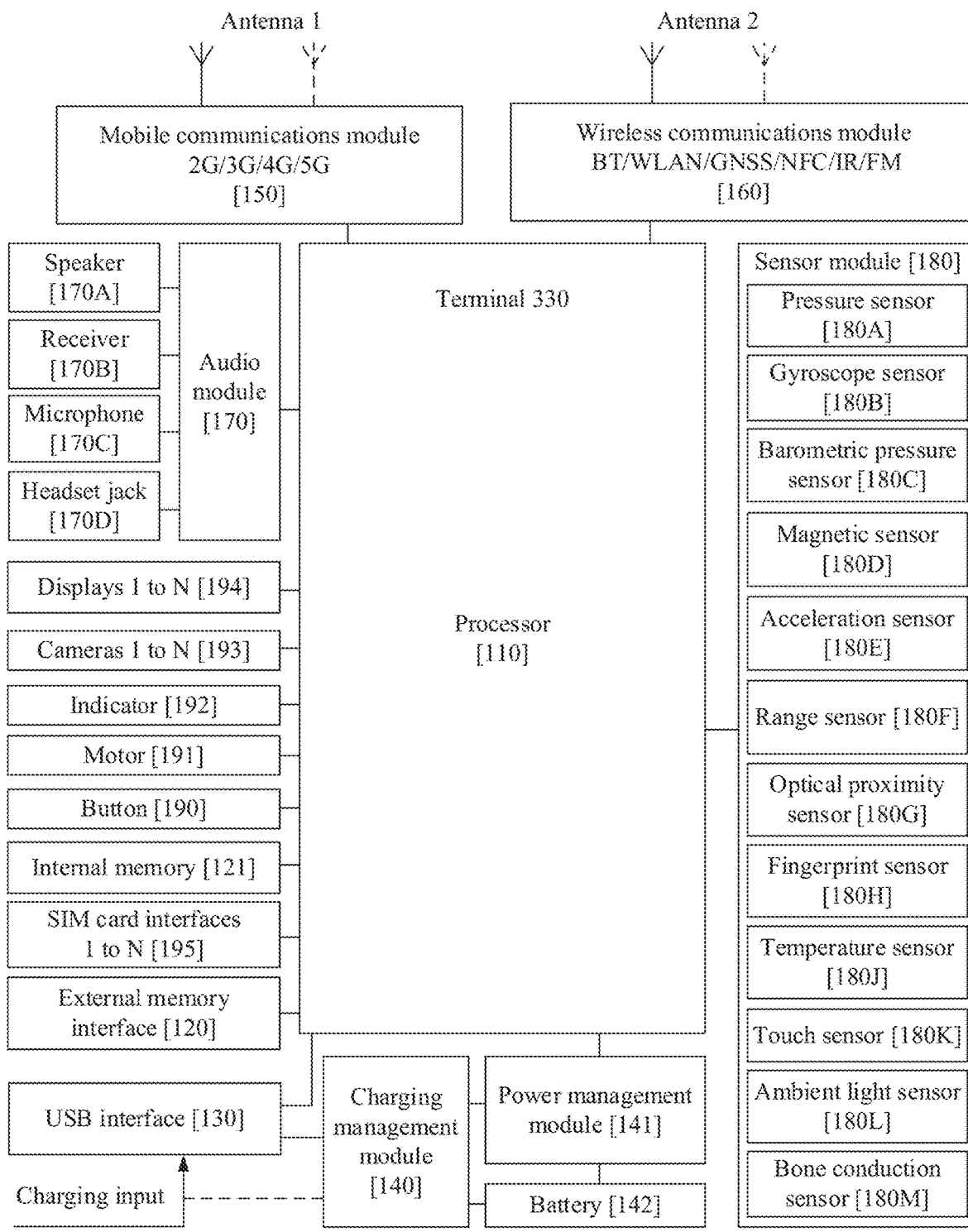
FIG. 1 is a diagram of a hardware architecture of a terminal 330 according to an embodiment of this application.

FIG. 1 is a schematic diagram of the hardware architecture of the terminal 330.

It should be understood that the terminal 330 shown in FIG. 1 is merely an example, and the terminal 330 may have more or fewer components than those shown in FIG. 1, may have two or more components combined, or may have different component configurations. Various components shown in the figure may be implemented in hardware including one or more signal processing circuits or application-specific integrated circuits, software, or a combination of hardware and software.

The terminal 330 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in embodiments of the present invention does not constitute a specific limitation on the terminal 330. In some other embodiments of this application, the terminal 330 may include more or fewer components than those shown in the figure, have some components combined, have some components split, or have different component arrangements. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, or a neural-network processing unit (neural-network processing unit, NPU). Different processing units may be independent devices, or may be integrated into one or more processors.

The controller may be a nerve center and a command center of the terminal 330. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access and reduces waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, or the like.

The charging management module 140 is configured to receive a charging input from the charger.

The power management module 141 is configured to connect the battery 142 and the charging management module 140 to the processor 110.

A wireless communication function of the terminal 330 may be implemented by using the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the terminal 330 may be configured to cover one or more communications frequency bands. Different antennas may be further multiplexed, to improve antenna utilization.

The mobile communications module 150 can provide a solution, applied to the terminal 330, to wireless communication including 2G/3G/4G/5G and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to a modem processor for demodulation. The mobile communications module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal.

The wireless communications module 160 may provide a solution, applied to the terminal 330, to wireless communication including a wireless local area network (wireless local area networks. WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

The terminal 330 implements a display function through the GPU, the display 194, the application processor, and the like. The display 194 is configured to display an image, a video, and the like. The display 194 includes a display panel.

The terminal 330 can implement a photographing function by using the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. The photosensitive element of the camera converts an optical signal into an electrical signal, and transmits the electrical signal to the ISP for processing, to convert the electrical signal into a visible image.

The camera 193 is configured to capture a static image or a video. An optical image of an object is generated through the lens, and is projected to the photosensitive element.

The digital signal processor is configured to process a digital signal, and may process another digital signal in addition to the digital image signal.

The NPU is a neural-network (neural-network, NN) computing processor. The NPU quickly processes input information by referring to a structure of a biological neural network, for example, a transfer mode between human brain neurons, and may further continuously perform self-learning.

The external memory interface 120 may be configured to be connected to an external storage card such as a micro SD card, to extend a storage capability of the terminal 330.

The internal memory 121 may be configured to store computer-executable program code. The executable program code includes instructions. The processor 110 runs the instructions stored in the internal memory 121, to implement various function applications and data processing of the terminal 330.

The terminal 330 may implement audio functions such as music playing and recording through the audio module 170, the speaker 170A, the receiver 170B, the microphone 170C, the headset jack 170D, the application processor, and the like.

The audio module 170 is configured to convert digital audio information into analog audio signal output, and is also configured to convert analog audio input into a digital audio signal. The audio module 170 may further be configured to code and decode audio signals.

The speaker 170A, also referred to as a "loudspeaker", is configured to convert an audio electrical signal into a sound signal. The terminal 330 may be used to listen to music or listen to a hands-free call through the speaker 170A.

The receiver 170B, also referred to as an "earpiece", is configured to convert an audio electrical signal into a sound signal. When a call is answered or a voice message is listened to by using the terminal 330, the receiver 170B may be put close to a human ear to listen to a voice.

The microphone 170C, also referred to as a "mike" or a "mic", is configured to convert a sound signal into an electrical signal. When making a call or sending a voice message, a user may make a sound near the microphone 170C through the mouth, to enter a sound signal to the microphone 170C. At least one microphone 170C may be disposed in the terminal 330. In some other embodiments, two microphones 170C may be disposed in the terminal 330, to collect a sound signal and further implement a noise reduction function. In some other embodiments, three, four, or more microphones 170C may alternatively be disposed in the terminal 330, to collect a sound signal, reduce noise, identify a sound source, implement a directional recording function, and the like.

In this embodiment, the terminal 330 collects a sound signal through the microphone 170C and transmits the sound signal to an application program in the terminal 330.

The headset jack 170D is configured to connect to a wired headset.

The pressure sensor 180A is configured to sense a pressure signal, and can convert the pressure signal into an electrical signal. The gyroscope sensor 180B may be configured to determine a moving posture of the terminal 330. The barometric pressure sensor 180C is configured to measure barometric pressure. The magnetic sensor 180D includes a Hall effect sensor. The terminal 330 may detect opening and closing of a flip cover by using the magnetic sensor 180D. The acceleration sensor 180E may detect values of accelerations of the terminal 330 in various directions (usually on three axes).

The range sensor 180F is configured to measure a distance. The optical proximity sensor 180G may include, for example, a light-emitting diode (LED) and an optical detector such as a photodiode. The ambient light sensor 180L is configured to sense ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touch screen".

The bone conduction sensor 180M may obtain a vibration signal. In some embodiments, the bone conduction sensor 180M may obtain a vibration signal of a vibration bone of a human vocal-cord part.

The gyroscope sensor 180B may be configured to determine a motion posture of the electronic device 100. The barometric pressure sensor 180C is configured to measure barometric pressure. The magnetic sensor 180D includes a Hall effect sensor. The acceleration sensor 180E may detect magnitudes of accelerations of the electronic device 100 in various directions (usually on three axes), and may detect magnitude and a direction of gravity when the electronic device 100 is still. The range sensor 180F is configured to measure a distance. The optical proximity sensor 180G may include, for example, a light-emitting diode (LED) and an optical detector such as a photodiode. The ambient light sensor 180L is configured to sense ambient light brightness. The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like. The temperature sensor 180J is configured to detect a temperature. The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may alternatively be disposed on a surface of the electronic device 100 at a location different from that of the display 194. The bone conduction sensor 180M may obtain a vibration signal. The button 190 includes a power button, a volume button, and the like. The motor 191 may generate a vibration prompt. The motor 191 may be configured to produce an incoming call vibration prompt and a touch vibration feedback. The indicator 192 may be an indicator lamp, and may be configured to indicate a charging status and a power change, or may be configured to indicate a message, a missed call, a notification, and the like. The SIM card interface 195 is configured to connect to a SIM card.

For ease of understanding this application, the following describes terms in this application.

1. Multilingual Subtitles

A video includes multilingual subtitles. For example, a video includes Chinese, English, and Japanese subtitles. When playing the video in a video application, a user may select subtitles in a specific language.

2. Multilingual Audio

A video includes multilingual audio. For example, a video includes Chinese, English, and Japanese audio. When playing the video in a video application, a user may select audio in a specific language.

3. Video Transcoding

A content source file of a video is transcoded into media asset media (including an audio medium file, a video stream medium file, and a subtitle medium file) with various encapsulation protocols and encoding formats to adapt to different types of terminals. The encapsulation protocols may include dynamic adaptive streaming over HTTP (dynamic adaptive streaming over HTTP, DASH), HTTP live streaming (HTTP live streaming, HLS), and the like. HTTP is an abbreviation for hypertext transfer protocol (hypertext transfer protocol).

The encoding formats may include H.265, H.264, and the like.

For example, the content source file of the video is transcoded into two media asset media: DASH+H.265 and HLS+H.264. Each media asset medium includes a plurality of resolutions, a plurality of bitrates, multilingual audio information, and multilingual subtitle information.

4. Media Asset Medium

A media asset medium is a set of medium files of one or more streams with specific attributes of a same video. For example, the specific attributes may be an encapsulation protocol and an encoding format.

If the same video has a plurality of streams (for example, a stream 1 and a stream 2), the streams have different attributes. The stream 1 is transcoded to obtain a medium file of the stream 1. The stream 2 is transcoded to obtain a medium file of the stream 2. Media asset media of the video include the medium file of the stream 1 and the medium file of the stream 2.

5. Index File

One media asset medium corresponds to one index file. An index file of a media asset medium includes description information of streams (for example, multilingual audio, multilingual subtitles, and a plurality of video streams) corresponding to a medium file contained in the media asset medium. The description information may include at least one of a file identifier, resolution, bitrate, encoding format, and download uniform resource locator (uniform resource locator, URL).

The file identifier may be "Chinese subtitles", "Chinese audio", "English audio", or the like.

The resolution may be 480p, 1080p, 4K, or the like.

The bitrate may be 2.5 megabits per second (million bits per second, mbps), 3.5 Mbps, or the like.

The index file may be an index plain text file encoded in 8-bit unicode transformation format (8-bit unicode transformation format, UTF-8), which is certainly not limited thereto.

For example, an index file of a media asset medium to which a medium file corresponding to a stream whose encapsulation protocol is DASH belongs is in a media presentation description (media presentation description, MPD) format. An index file of a media asset medium to which a medium file corresponding to a stream whose encapsulation protocol is HLS belongs is in an M3U8 format.

A CDN server downloads video playing content (including a video stream audio, and subtitles) through an index file.

6. Metadata Information of a Video

Metadata information of a video may include a director name of the video, an identifier of the video (for example, a name of the video), a show time of the video, a media asset medium of the video, and the like. The media asset medium of the video may include at least one of a download URL of an index file of the media asset medium, an identifier of the media asset medium, and the like.

The metadata information of the video may further include other information, and the media asset medium of the video may further include other information. This is not limited in this application.

7. Media Asset Server

A media asset server introduces and processes a content source file of a video, stores the content source file of the video and media asset media obtained after the content source file of the video is transcoded, synchronizes the media asset media (including a video stream medium, an audio stream medium, and a subtitle file medium) obtained after transcoding to a CDN delivery system, and synchronizes metadata information of video content to a content management system.

8. CDN Server

A CDN server is a content delivery system Relying on edge servers deployed in various places, the content delivery system enables a user to obtain required content nearby through functional modules, such as load balancing, content delivery, and scheduling, of a central platform. Network congestion is reduced, and a response speed and hit rate of user access are increased.

The CDN server herein is configured to store a medium file and an index file of video content, and send the medium file and the index file of the target video to a terminal in response to a playing URL of the target video sent by the terminal.

9. Content Management Server

The content management server is a system that manages content of one or more videos, including content presentation, content operation, and the like. The content management server obtains metadata information of a video from a media asset server.

Currently, a method for adding new-language subtitles and new-language audio to a video that has been released in a video application may be as follows:

For example, a video that has been released and operated in a video application has only English subtitles, Chinese subtitles, and English audio upon its release. Half a year after the video is released, an administrator of the video application purchases French audio and French subtitles of the video from a producer of the video. The administrator of the video application needs to add the French audio and French subtitles to the video that has been released, so that a user can switch to the French audio and French subtitles to watch the video during viewing.

Figure 2:
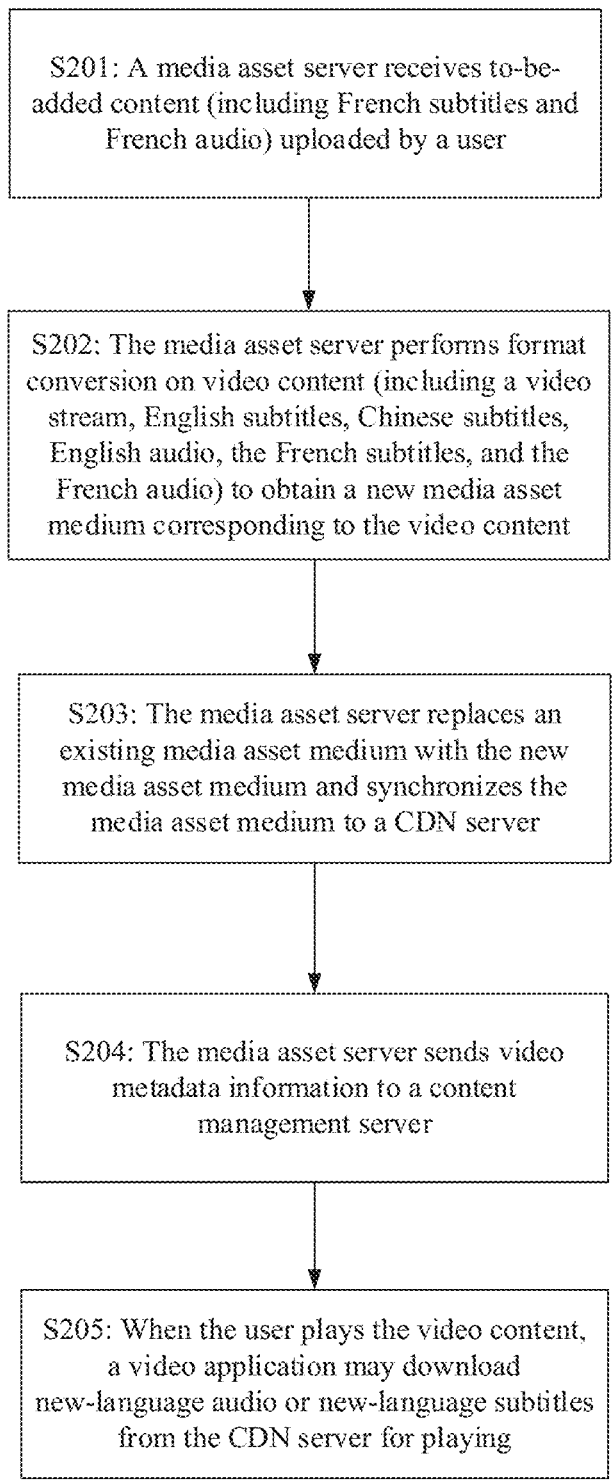
FIG. 2 is a flowchart of a method for adding subtitles and/or audio in the conventional technology according to an embodiment of this application.

Solution 1:

As shown in FIG. 2, adding the French audio and French subtitles of the video includes the following steps:

S201: A media asset server receives to-be-added content (including the French subtitles and French audio) uploaded by the user.

S202: The media asset server performs format conversion on video content (including a video stream, the English subtitles, the Chinese subtitles, the English audio, the French subtitles, and the French audio) to obtain a new media asset medium corresponding to the video content.

After the media asset server receives the to-be-added content (including the French subtitles and French audio) uploaded by the user, the media asset server first discontinues existing content (including the video stream, English subtitles, Chinese subtitles, and English audio) of the video, then performs format conversion on the existing content (including the video stream, English subtitles, Chinese subtitles, and English audio) and the to-be-added content (including the French subtitles and French audio) of the video, and packages the content into the new media asset medium.

S203: The media asset server replaces an existing media asset medium with the new media asset medium and synchronizes the media asset medium to a CDN server.

S204: The media asset server sends metadata information of the video to a content management server.

S205: When the user plays the video content, the video application may obtain new-language audio or new-language subtitles from the CDN server for playing.

Based on the solution 1, when video content is operated in different countries and regions, subtitles in other languages and audio in other languages often need to be added to content of a plurality of videos that have been released. A current method for fully retranscoding and replacing video content has the following major disadvantages:

1. Resource Consumption and Transcoding Costs are High.

To add new-language subtitles or audio to content of a video that has been released, a source file of the video is re-encoded into an H.265 or H.264 medium file, which consumes a large amount of computing resources. For example, a 42C192G server requires 1 hour of computing resources to transcode video content to H.264 video content of 6 streams with different resolutions, different bitrates, and duration of 1 hour, or requires 2 hours of computing resources for encoding it to H.265 video content. If a batch of tens of thousands of hours of video content is retranscoded, a large amount of computing resources are consumed and transcoding costs are high.

2. Normal Content Operation and Release are Affected.

A batch of sudden transcoding requirements due to addition of new-language subtitles or audio exerts great pressure on normal release and transcoding and affects a pace of normal operation and release of the video content.

3. Retranscoding and Release Efficiency is Low for Adding New-Language Subtitles or Audio.

To add only new-language subtitles or audio to content of a video, existing content and the new-language subtitles or audio of the video are retranscoded and then released. The transcoding requires a long time. Consequently, release efficiency is low due to adding of the new-language subtitles or audio, and requirements for urgent addition of the new-language subtitles or audio cannot be supported.

Solution 2:

A subtitle server that is independently deployed is used, and new-language subtitles of a video are placed on the subtitle server.

Specifically, to add the new-language subtitles to content of the video that has been released, a new-language subtitle file is placed on the independent subtitle server.

When playing the content of the video, a video application obtains subtitle language information from the independent subtitle server and displays the information in a playing interface.

The independent subtitle server is deployed and the new-language subtitles are placed on the subtitle server instead of being packaged into a media asset medium obtained after the video is transcoded. The new-language subtitles are uploaded to the independent subtitle server without retranscoding the content. This solution has the following major disadvantages:

1. The Independent Subtitle Server is Added. The External Subtitle Solution has Additional Deployment and Operations and Maintenance Costs.

Although the content does not need to be retranscoded and transcoding costs are reduced in the independent external subtitle solution, the independent external subtitle server has the additional deployment and operations and maintenance costs, and increases a failure rate of a system.

2. Private Customization and Non-Standard Support of an Application or a Player are Required.

The external subtitle solution requires non-standard support of the video application. When playing content, the system obtains multilingual subtitle information from a private subtitle delivery server. DASH and HLS solutions that use transcoding are global standards. Players that comply with the standards can normally switch between languages for playing.

3. Independent External Subtitles May Affect Playing Experience, and this Solution is not Applicable to Adding New-Language Audio.

A delay for synchronizing the subtitles with a mouth shape of a character in the video content generally needs to be within 200 ms. Because the video application needs to access the independent subtitle server when obtaining the subtitles of the video content, the subtitle obtaining process may not be synchronized with a process of downloading a video stream and audio of the video content. If the subtitle file returned by the subtitle server is late, the playing experience is affected.

A delay for synchronizing the mouth shape with the audio is smaller and needs to be within 90 ms. The audio and video streams need to be obtained when playing starts, to avoid a problem of synchronization of the audio with the video. If the solution that uses the independent external server causes a long playing start delay, the solution is not applicable to adding the new-language audio to the video content.

To resolve the foregoing problems, the present invention provides a method and a system for adding new-language subtitles or new-language audio. The method includes:

A media asset server receives an identifier and a new-language file of a target video and converts the new-language file into a new-language medium file. The media asset server finds a first index file based on the identifier of the target video, and adds a storage address of the new-language medium file on the media asset server to the first index file to obtain a second index file. The media asset server sends the new-language medium file and the second index file to a content delivery server. The content delivery server replaces the storage address of the new-language medium file on the media asset server in the second index file with a storage address of the new-language medium file on the content delivery server to obtain a third index file. The content delivery server generates a first URL of the target video. In the method, to add new-language subtitles or new-language audio of the target video, it is only necessary to transcode and release the new-language subtitles or new-language audio of the target video. In this way, costs are greatly reduced and operation efficiency is improved.

Figure 3:
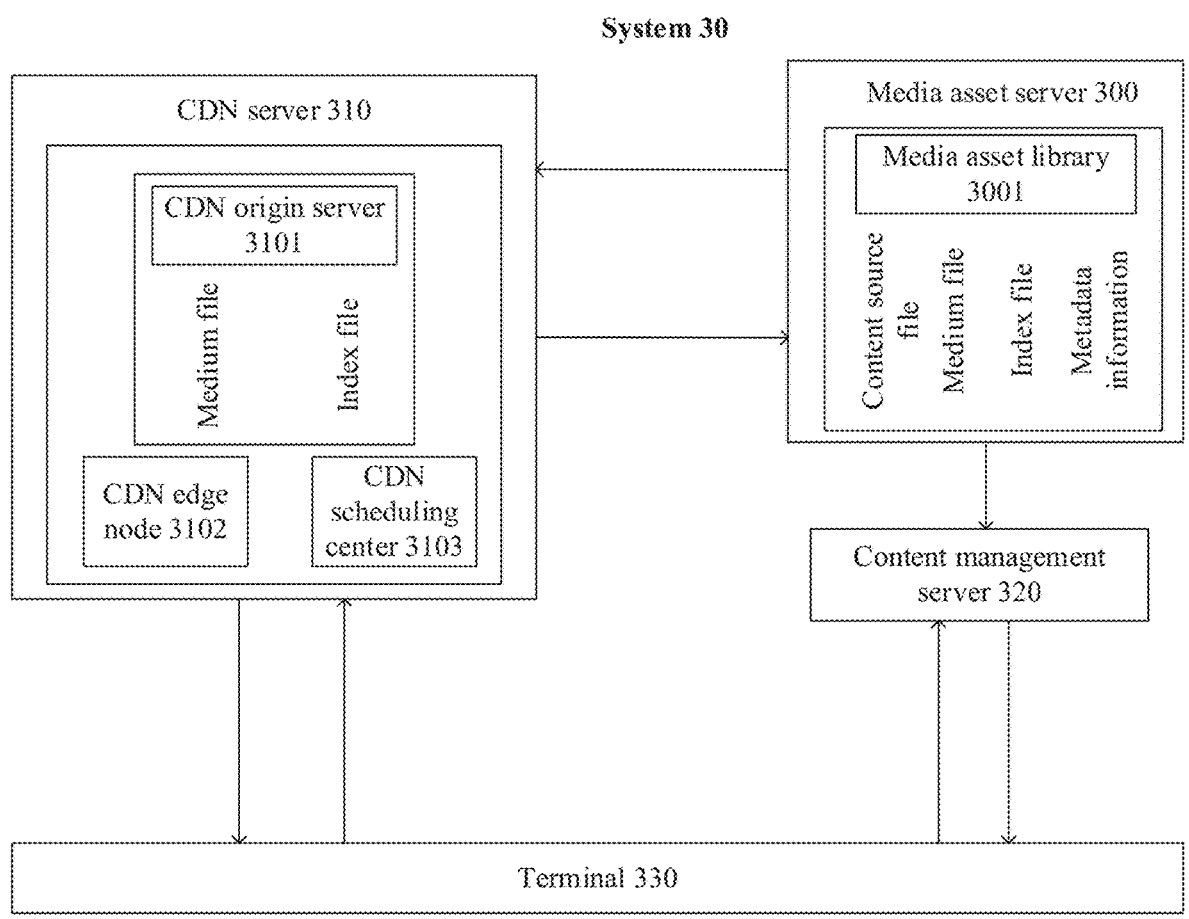
FIG. 3 is a framework diagram of a system of a method for adding subtitles and/or audio according to an embodiment of this application.

FIG. 3 is a framework diagram of a system of a method for adding subtitles and/or audio according to an embodiment of this application. As shown in FIG. 3, a system 30 includes a media asset server 300, a CDN server 310, a content management server 320, and a terminal 330.

In some embodiments, the system 30 may further include a transcoding server. This is not limited in this embodiment of this application.

The media asset server 300 includes a media asset library 3001. The media asset library 3001 may be configured to store a content source file of a video, metadata information of the video, and an index file and a medium file of the video.

The media asset server 300 is further configured to send the index file and the medium file of the video to the CDN server 310, send the metadata information of the target video to the content management server 320, and the like.

The CDN server 310 is configured to receive and store the index file and the medium file of the video that are sent by the media asset server 300, and is further configured to generate a playing URL of the target video and send the playing URL of the target video to the media asset server 300. The CDN server 310 is further configured to send the medium file and the index file of the target video to the terminal in response to the playing URL of the target video sent by the terminal.

As shown in FIG. 3, the CDN server 310 includes a CDN origin server 3101, a CDN edge node 3102, and a CDN scheduling center 3103.

After obtaining the playing URL of the target video from the content management server in response to a playing request of a user, the terminal 330 sends a request (including the playing URL of the target video) to the CDN scheduling center. The CDN scheduling center schedules the request to a CDN edge node closest to the terminal 330 (there may be a plurality of scheduling methods, and a proximity scheduling principle is generally used; for example, if the user of the terminal 330 is located in Nanjing, the CDN server 310 schedules the video playing request to a CDN edge node located in Nanjing). The CDN edge node determines whether the index file of the target video to be downloaded exists on the node. If yes, the CDN edge node sends the index file of the target video to the terminal 330. If no, the CDN edge node initiates a download request to the CDN origin server, where the request is used to indicate the CDN origin server to send the index file of the target video to the CDN edge node, and the CDN edge node then sends the index file of the target video to the terminal 330.

After the terminal 330 obtains the index file, the terminal 330 plays the target video based on the index file. The terminal 330 displays a video stream, first-language subtitles, and first-language audio of the target video in the following three manners:

Manner 1: The terminal 330 obtains a download URL of a first-language audio medium file and a download URL of a first-language subtitle medium file from the index file based on the first-language audio and the first-language subtitles preset in a first video application. The terminal 330 obtains the first-language audio medium file and the first-language subtitle medium file of the target video based on the download URL of the first-language audio medium file and the download URL of the first-language subtitle medium file.

The CDN server 310 integrates a video stream medium file, the first-language audio medium file, and the first-language subtitle medium file of the target video into a playing file. The CDN server 310 sends the playing file to the terminal 330. The terminal 330 downloads the playing file in real time. The first video application displays the video stream, the first-language audio, and the first-language subtitles of the target video in real time.

Manner 2: The terminal 330 obtains the download URL of the first-language audio medium file and the download URL of the first-language subtitle medium file from a third index file based on the first-language audio and the first-language subtitles preset in the first video application. The terminal 330 obtains the first-language audio medium file and the first-language subtitle medium file of the target video based on the download URL of the first-language audio medium file and the download URL of the first-language subtitle medium file.

The CDN server 310 sends the video stream medium file, the first-language audio medium file, and the first-language subtitle medium file of the target video to the terminal 330 in real time. The terminal 330 receives the video stream medium file, the first-language audio medium file, and the first-language subtitle medium file of the target video in real time, and integrates them into a playing file. The terminal 330 plays the target video based on the playing file. The first video application displays the video stream, the first-language audio, and the first-language subtitles of the target video in real time.

Manner 3: The CDN server 310 integrates the video stream medium file, audio medium files of various languages, and subtitle medium files of various languages of the target video into N playing files with subtitles in specified languages and audio in the specified languages.

For example, the CDN server 310 integrates the target video into four playing files with subtitles and audio in specified languages: a playing file with the video stream, Chinese subtitles, and Chinese audio, a playing file with the video stream, English subtitles, and English audio, a playing file with the video stream, the Chinese subtitles, and the English audio, and a playing file with the video stream, the English subtitles, and the Chinese audio.

The terminal 330 obtains the download URL of the first-language audio medium file and the download URL of the first-language subtitle medium file from the third index file based on the first-language audio and the first-language subtitles preset in the first video application. The terminal 330 obtains a playing file with the first-language subtitles and the first-language audio of the target video based on the download URL of the first-language audio medium file and the download URL of the first-language subtitle medium file. The terminal 330 plays the target video based on the playing file. The first video application displays the video stream, the first-language audio, and the first-language subtitles of the target video in real time.

It should be noted that the foregoing embodiments are merely used to explain this application and shall not constitute a limitation.

The content management server 320 may be configured to perform operation management on one or more videos, for example, to manage metadata information of the one or more videos. The content management server 320 is further configured to receive the metadata information of the one or more videos sent by the media asset server 300, receive the request to play the target video from the terminal 330, and send the playing URL of the target video to the terminal 330.

The terminal 330 may be configured to install the first video application. The terminal 330 may be configured to send the request to play the target video to the content management server, receive the playing URL of the target video sent by the content management server 320, send the playing URL of the target video to the CDN server 310, and receive the index file and the medium file of the target video sent by the CDN server 310.

Optionally, the transcoding server may be configured to transcode the content source file of the video into a type of file that can be played by the video application installed on the terminal 330.

In some embodiments, the media asset server 300, the CDN server 310, and the content management server 320 may all be independently located on one physical device, or any two or more of the servers may be integrated on a same physical device.

It should be noted that the system 30 is merely used to explain this application and shall not constitute a limitation.

The following clearly describes technical solutions in embodiments of this application with reference to the accompanying drawings in embodiments of this application.

Figure 4:
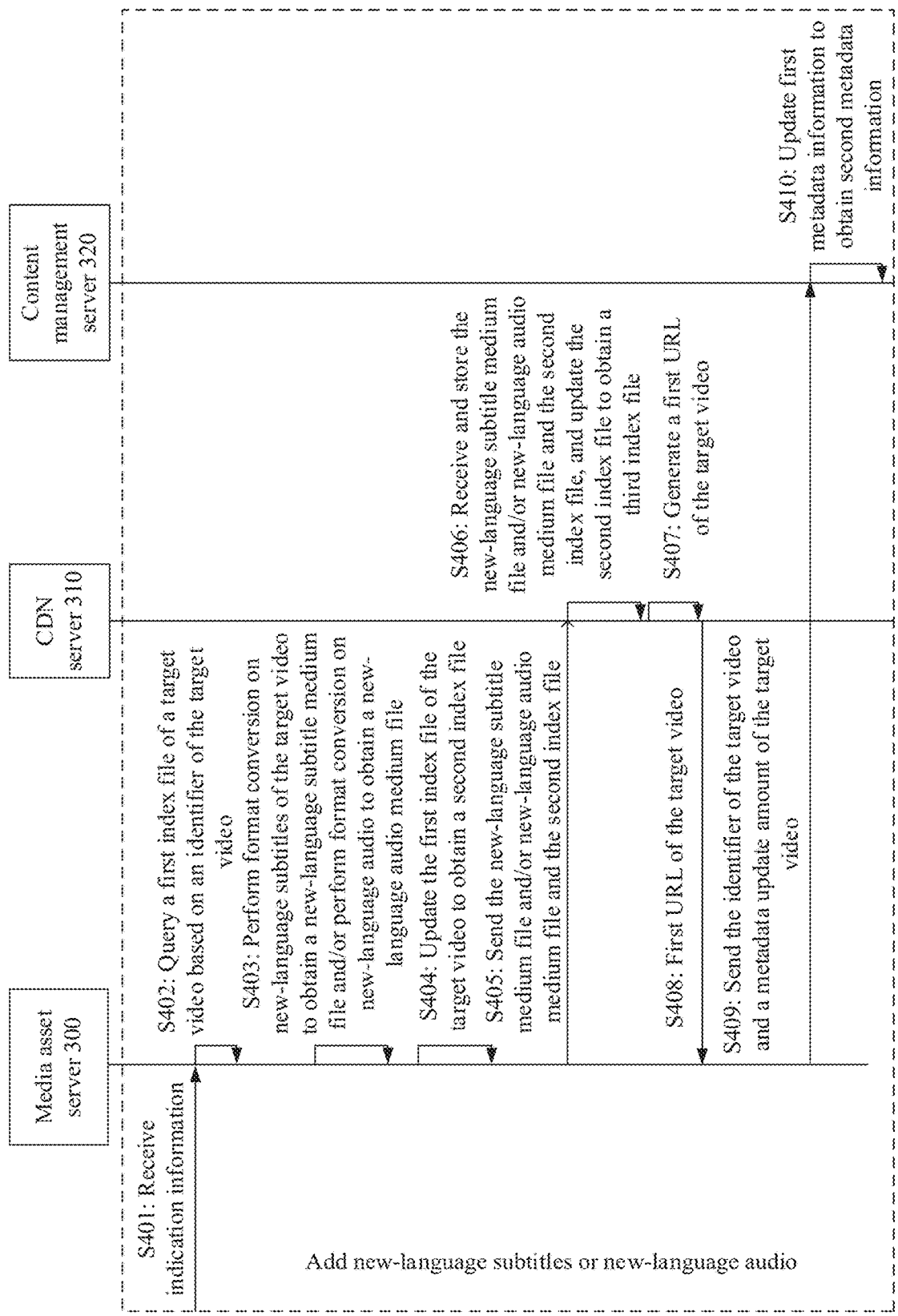
FIG. 4 is a flowchart of a method for adding subtitles and/or audio according to an embodiment of this application.

As shown in FIG. 4, S401 to S410 are a flowchart of a method for adding subtitles and/or audio to a target video according to an embodiment of this application.

FIG. 4 is a flowchart of a method for adding new-language subtitles or new-language audio according to an embodiment of this application. The method may be applied to the system 30 shown in FIG. 3. The system 30 may include the media asset server 300, the CDN server 310, the content management server 320, and the terminal 330. For a specific description of the system 30, references may be made to the embodiment shown in FIG. 3, and details are not described herein again. The method may include:

S401: The media asset server 300 receives indication information.

The indication information may be input by an administrator of a video application. The indication message includes a subtitle addition instruction, an identifier of a target video (for example, a name of the target video), and new-language subtitles of the target video; and/or an audio addition instruction, the identifier of the target video, and new-language audio of the target video.

The prompt information does not actually exist and is optional. The prompt information is introduced for ease of description.

The foregoing description may be replaced by the following description: The media asset server 300 receives the subtitle addition instruction, the identifier of the target video (for example, the name of the target video), and the new-language subtitles of the target video; and/or the audio addition instruction, the identifier of the target video, and the new-language audio of the target video. The subtitle addition instruction is optional. This is not limited herein.

The new-language subtitles of the target video may also be referred to as to-be-added subtitles of the target video. The new-language audio of the target video may also be referred to as to-be-added audio of the target video.

The new-language subtitles of the target video and/or the new-language audio of the target video may also be referred to as a new-language file.

The new-language subtitles are subtitles corresponding to a new language added on the basis of existing-language subtitles of the target video. The new-language audio is audio corresponding to the new language added on the basis of the existing-language audio of the target video.

For example, a video is released and operated in the video application, and the video in the video application has only English subtitles, Chinese subtitles, and English audio upon its release. The administrator of the video application wants to release French subtitles and French audio of the video. The administrator of the video application sends indication information to the media asset server 300, where the indication information includes an instruction for adding the French subtitles and French audio of the video, a name of the video, and the French subtitles and French audio of the video.

S402: The media asset server 300 obtains a first index file of the target video based on the identifier of the target video.

Optionally, the media asset server 300 stores a plurality of index files of a plurality of videos. The media asset server 300 may find, based on the identifier of the target video, an index file corresponding to the identifier of the target video.

For example, the videos included in the media asset server 300 include "Sisters Who Make Waves" and "Back to Field".

In this case, the media asset server 300 includes an index file A of the video "Sisters Who Make Waves" and an index file B of the video "Back to Field".

In this embodiment, for ease of description, the identifier of the video and a download URL of each medium file are referred to as description information.

The index file A includes description information, where the description information includes a video identifier "Sisters Who Make Waves", an identifier "Chinese subtitles" of a Chinese subtitle medium file, an identifier "Chinese audio" of a Chinese audio medium file, a download URL of the Chinese subtitle medium file, a download URL of the Chinese audio medium file, and the like.

The description information does not actually exist and is optional. The description information is introduced for ease of description.

The foregoing description may be replaced by the following description: The index file A includes the video identifier "Sisters Who Make Waves", the identifier "Chinese subtitles" of the Chinese subtitle medium file, the identifier "Chinese audio" of the Chinese audio medium file, the download URL of the Chinese subtitle medium file, the download URL of the Chinese audio medium file, and the like.

The index file B includes description information, where the description information includes a video identifier "Back to Field", an identifier "Chinese subtitles" of a Chinese subtitle medium file, an identifier "Chinese audio" of a Chinese audio medium file, a download URL of the Chinese subtitle medium file, a download URL of the Chinese audio medium file, and the like.

For example, if the identifier of the target video is "Sisters Who Make Waves", the media asset server 300 may find the index file A based on the identifier "Sisters Who Make Waves" of the target video.

The media asset server 300 receives the indication information, and the media asset server 300 obtains the first index file based on the identifier of the target video.

The media asset server 300 stores a source file of the target video (a video stream, existing-language subtitles, and existing-language audio of the target video), and a medium file and the first index file corresponding to the source file of the target video. The first index file includes description information of the medium file corresponding to the source file of the target video.

A video stream medium file, an existing-language subtitle medium file, and an existing-language audio medium file of the target video may be referred to as an existing-language medium file.

The existing-language medium file refers to the video stream medium file, the existing-language subtitle medium file, and the existing-language audio medium file in the media asset server 300.

The existing-language medium file may include the video stream medium file, and an existing-language subtitle medium file and/or an existing-language audio medium file of the target video.

The description information of the medium file corresponding to the source file of the target video may include identifiers, download URLs, and the like of the video stream medium file, the existing-language subtitle medium file, and the existing-language audio medium file of the target video.

The download URL of the existing-language subtitle medium file and/or the existing-language audio medium file may also be referred to as a URL of the existing-language medium file.

The description information of the medium file corresponding to the source file of the target video may further include other information. This is not limited in this application.

For example, in this embodiment, before French subtitles and French audio are added to a video, the media asset server 300 receives and stores a source file of the video (including a video stream, English subtitles, Chinese subtitles, and English audio of the video) uploaded by the administrator of the video application. In addition, the media asset server 300 transcodes the source file of the video to obtain a corresponding medium file, where the medium file is a type of file that can be played by the video application. Furthermore, the media asset server 300 generates a first index file, where the first index file includes description information of the medium file corresponding to the video stream, English subtitles, Chinese subtitles, and English audio of the video.

For example, the description information in the first index file may include a name of the video, subtitle identifiers "Chinese subtitles" and "English subtitles", an audio identifier "English audio", and a download URL of each medium file.

The description information in the first index file may further include an encoding format of a Chinese subtitle medium file, an encoding format of an English subtitle medium file, an encoding format of an English audio medium file, and the like. This is not limited herein in this application.

S403: The media asset server 300 performs format conversion on the new-language subtitles of the target video to obtain a new-language subtitle medium file and/or performs format conversion on the new-language audio to obtain a new-language audio medium file.

The media asset server 300 performs format conversion on the new-language subtitles of the target video to obtain the new-language subtitle medium file and/or performs format conversion on the new-language audio to obtain the new-language audio medium file.

Herein, the format conversion is to convert the new-language subtitles and/or the new-language audio of the target video into a file format that can be recognized and played by the video application, for example, the new-language subtitle medium file and/or the new-language audio medium file encapsulated in an MP4 file format.

S404: The media asset server 300 updates the first index file of the target video (including adding description information of the new-language subtitle medium file and/or description information of the new-language audio medium file to the first index file) to obtain a second index file.

The description information of the new-language subtitle medium file may include an identifier (for example, French subtitles) of the new-language subtitle medium file, an encoding format of the new-language subtitle medium file, a first URL of the new-language subtitle medium file, and the like.

The description information of the new-language audio medium file may include an identifier (for example, French audio) of the new-language audio medium file, an encoding format of the new-language audio medium file, a first URL of the new-language audio medium file, and the like.

The first URL of the new-language subtitle medium file includes a storage address of the new-language subtitle medium file on the media asset server 300. The first URL of the new-language audio medium file includes a storage address of the new-language audio medium file on the media asset server 300.

Herein, the storage address of the new-language medium file on the media asset server may also be referred to as the first URL of the new-language medium file.

The media asset server 300 adds the description information of the new-language subtitles and/or the description information of the new-language audio to the first index file to update the first index file. For ease of description, an updated first index file is referred to as the second index file.

S405: The media asset server 300 sends the new-language subtitle medium file and/or the new-language audio medium file and the second index file to the CDN server 310.

S406: The CDN server 310 receives and stores the new-language subtitle medium file and/or the new-language audio medium file and the second index file, and updates the second index file (changes the first URL of the new-language subtitle medium file to a second URL of the new-language subtitle medium file and/or changes the first URL of the new-language audio medium file to a second URL of the new-language audio medium file) to obtain a third index file.

The second URL of the new-language subtitle medium file includes a storage address of the new-language subtitle medium file on the CDN server 310. The second URL of the new-language audio medium file includes a storage address of the new-language audio medium file on the CDN server 310.

The media asset server 300 sends the new-language subtitle medium file and/or the new-language audio medium file and the second index file of the target video to the CDN server 310 based on the identifier of the target video (for example, the name of the target video).

The CDN server 310 receives the new-language subtitle medium file and/or the new-language audio medium file and the second index file of the target video.

Specifically, the media asset server 300 sends an address for obtaining the new-language subtitle medium file of the target video and/or an address for obtaining the new-language audio medium file and an address for obtaining the second index file to the CDN server 310 based on the identifier of the target video (for example, the name of the target video). The CDN server downloads the new-language subtitle medium file of the target video and/or the new-language audio medium file and the second index file from the media asset server 300 based on the address for obtaining the new-language subtitle medium file of the target video and/or the address for obtaining the new-language audio medium file and the address for obtaining the second index file.

The CDN server 310 stores the new-language subtitle medium file and/or the new-language audio medium file of the target video together with the video stream medium file, the existing-language subtitle medium file, and the existing-language audio medium file based on the identifier of the target video (for example, the name of the target video). The CDN server 310 replaces the first index file with the second index file. The CDN server 310 also updates the second index file by changing the first URL of the new-language subtitle medium file in the second index file to the second URL of the new-language subtitle medium file and/or changing the first URL of the new-language audio medium file to the second URL of the new-language audio medium file.

For ease of description, an updated second index file is referred to as the third index file.

S407: The CDN server 310 generates a first URL of the target video.

The first URL of the target video includes a download address of the third index file and security verification information for preventing playing through hotlinking.

S408: The CDN server 310 sends the first URL of the target video to the media asset server 300.

S409: The media asset server 300 sends the identifier of the target video and a metadata information update amount of the target video to the content management server 320.

S410: The content management server 320 updates first metadata information of the target video based on the metadata information update amount of the target video to obtain second metadata information.

The metadata information of the target video may include the identifier of the target video, a director name of the target video, a show time of the target video, media asset medium information of the target video, and the like.

The metadata information of the target video may further include other content. This is not limited in this application.

The metadata information update amount of the target video may include the first URL of the target video, the description information of the new-language subtitle medium file and/or the new-language audio medium file, and the like.

The content management server 320 receives and stores the identifier of the target video and the metadata information update amount of the target video.

The content management server 320 obtains the first metadata information of the target video based on the identifier of the target video.

The first metadata information includes the identifier of the target video, the director name of the target video, the show time of the target video, a second URL of the target video, and the like.

The second URL of the target video includes a download address of the first index file of the target video on the CDN server 310 and security verification information for preventing playing through hotlinking.

The content management server 320 updates the first metadata information of the target video based on the metadata information update amount of the target video to obtain the second metadata information.

Specifically, the content management server 320 replaces the second URL of the target video in the first metadata information with the first URL of the target video, and adds the description information of the new-language subtitle medium file and/or the description information of the new-language audio medium file to the first metadata information.

In some embodiments, "S409 and S410" may be replaced by "S409: The media asset server 300 updates the first metadata information of the target video based on the metadata information update amount of the target video to obtain the second metadata information. S410: The media asset server 300 sends the second metadata information to the content management server 320".

It can be understood that the foregoing embodiments are merely used to explain this application and shall not constitute a limitation.

Figure 5:
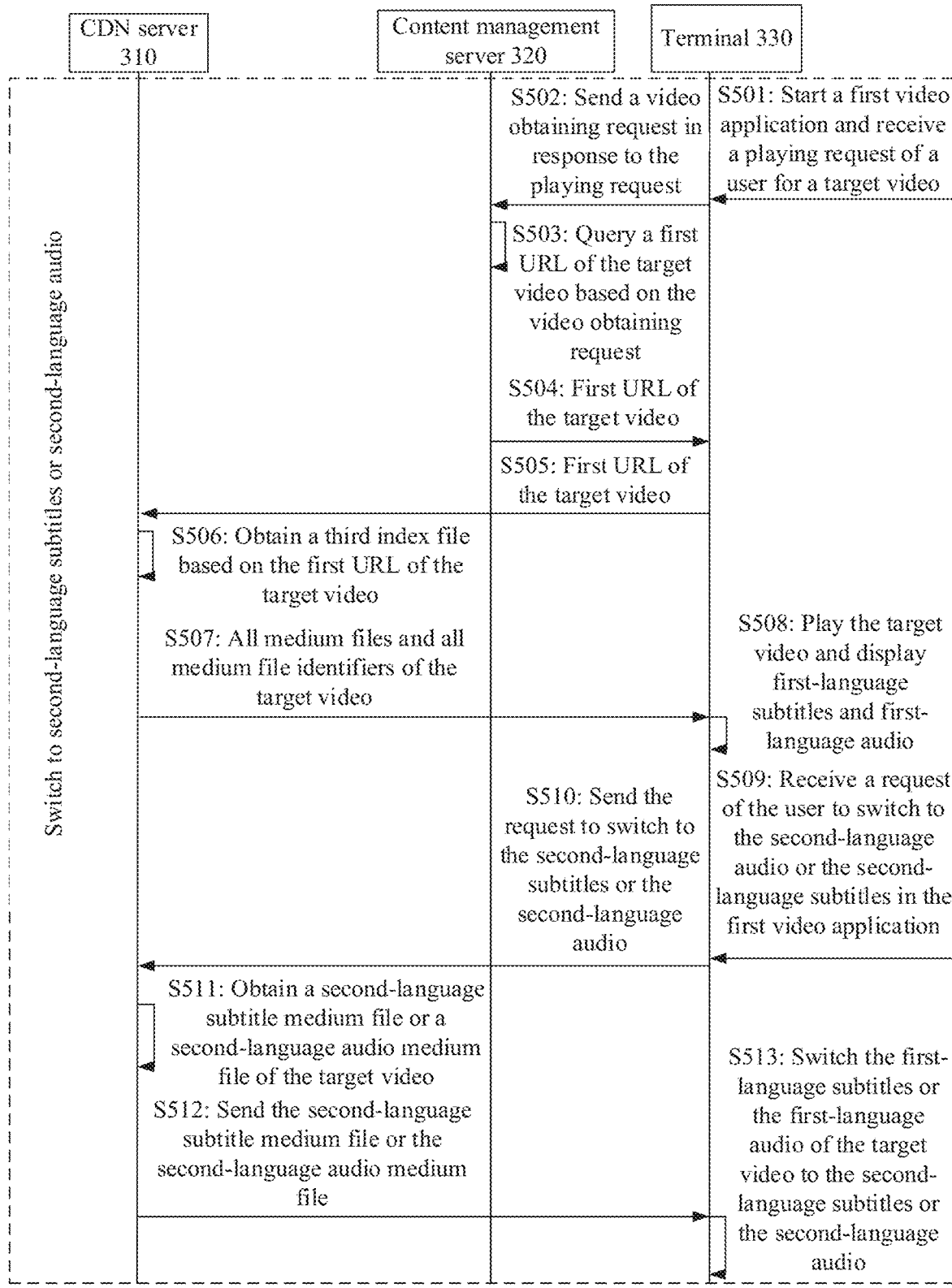
FIG. 5 is a flowchart of a method for switching to second-language subtitles or second-language audio of a target video according to an embodiment of this application.

FIG. 5 is a flowchart of a method in which the terminal 330 plays a target video and receives a request of a user to switch to second-language subtitles or second-language audio of the target video.

S501: The terminal 330 starts a first video application and receives a playing request of a user for the target video.

The first video application is installed on the terminal 330. The first video application provides an entry for triggering the playing request for the target video. The first video application may be a video player, such as Huawei Video. This is not limited in this application.

S502: The terminal 330 sends a video obtaining request (including an identifier of the target video) to the content management server 320 in response to the playing request.

The terminal 330 responds to the playing request for the target video, and the terminal 330 sends the video obtaining request to the content management server 320.

The video obtaining request carries the identifier of the target video. The identifier of the target video may also be a name of the target video.

S503: The content management server 320 queries a first URL of the target video based on the video obtaining request, where the first URL of the target video is in second metadata information.

The content management server 320 receives the video obtaining request and parses out the identifier of the target video carried in the video obtaining request. The content management server 320 queries the first URL of the target video based on the identifier of the target video.

S504: The content management server 320 sends the first URL of the target video to the terminal 330.

S505: The terminal 330 sends the first URL of the target video to the CDN server 310.

S506: The CDN server 310 obtains a third index file based on the first URL of the target video.

S507: The CDN server 310 sends the third index file of the target video to the terminal 330.

Before sending the third index file to the terminal 330, the CDN server 310 receives a first obtaining request sent by the terminal 330 for the first URL of the target video.

The first obtaining request is used by the CDN server 310 to obtain the third index file based on the first URL of the target video.

A CDN scheduling center sends a request with the first URL of the target video to a CDN edge node. The CDN edge node determines whether an index file of the target video to be downloaded exists on the node. If yes, the CDN edge node sends the index file of the target video to the terminal. If no, the CDN edge node initiates a download request to a CDN origin server. The CDN origin server sends the index file of the target video to the CDN edge node. The CDN edge node sends the index file of the target video to the terminal.

S508: The terminal 330 plays the target video based on the third index file (including a video stream, first-language subtitles, and first-language audio of the target video), and displays all language subtitle identifiers and all language audio identifiers of the target video.

The terminal 330 receives the third index file of the target video sent by the CDN server 310.

The third index file records description information of a video stream medium file of the target video, subtitle medium files of all languages, and audio medium files of all languages. The description information may be identifiers of the medium files. The identifiers of the medium files may include "video stream", "Chinese subtitles", "Chinese audio", "English subtitles", "English audio", "French subtitles", "French audio", download URLs of the medium files, and the like. Certainly, the description information of the medium files of the target video may further include other content. Details are not described herein.

The terminal 330 plays the first-language audio and the first-language subtitles based on preset settings of the first video application.

The terminal 330 obtains a download URL of the first-language audio medium file and a download URL of the first-language subtitle medium file of the target video from the third index file based on the first video application.

The terminal 330 sends a download request to the CDN scheduling center, where the download request is used to download the first-language audio medium file and the first-language subtitle medium file, and the download request carries the download URL of the first-language audio medium file and the download URL of the first-language subtitle medium file.

The CDN scheduling center sends the download request to the CDN edge node. The CDN edge node determines whether the first-language audio medium file and the first-language subtitle medium file of the target video to be downloaded exist on the node. If yes, the CDN edge node sends the first-language audio medium file and the first-language subtitle medium file of the target video to the terminal 330. If no, the CDN edge node initiates a download request to the CDN origin server. The CDN origin server sends the first-language audio medium file and the first-language subtitle medium file of the target video to the CDN edge node. The CDN edge node sends the first-language audio medium file and the first-language subtitle medium file of the target video to the terminal 330.

It may be understood that the first-language audio and the first-language subtitles are preset-language subtitles and preset-language subtitles of the first video application. For example, if the first-language audio of the first video application is Chinese audio, and the first-language subtitles of the first video application are Chinese subtitles, the terminal 330 displays video stream pictures, the Chinese subtitles, and the Chinese audio of the target video.

The terminal 330 parses out identifiers of the subtitle medium files of all languages and the identifiers of the audio medium files of all languages of the target video in the third index file. A user interface of the first video application may display the identifiers of the subtitle medium files of all languages and the identifiers of the audio medium files of all languages of the target video. The identifiers may be used by the user to choose to switch to the second-language subtitles or second-language audio.

It can be understood that the first-language subtitles and the second-language subtitles are subtitles in different languages; and the second-language audio and the second-language audio are audio in different languages.

For example, the first language may be Chinese, and the second language may be English. This is not limited in this application.

The following describes a process in which the first video application displays the video stream, the subtitles, and the audio of the target video with reference to three implementations.

The terminal 330 receives and responds to the playing request of the user for the target video. The terminal 330 sends the video obtaining request (including the identifier of the target video) to the content management server 320. The content management server 320 queries a first playing URL of the target video based on the video obtaining request. The content management server 320 sends the first playing URL of the target video to the terminal 330. The terminal 330 sends the first playing URL of the target video to the CDN server 310. The CDN server 310 obtains the third index file based on the first playing URL of the target video.

S509: The terminal 330 receives the request of the user to switch to the second-language audio or the second-language subtitles in the first video application.

The terminal 330 parses out a download URL of a second-language subtitle medium file or a download URL of a second-language audio medium file based on the third index file.

Specifically, the terminal 330 parses out the download URL of the second-language subtitle medium file in the third index file in response to the request to switch to the second-language subtitles or parses out the download URL of the second-language audio medium file of the target video in the third index file in response to the request to switch to the second-language audio.

S510: The terminal 330 sends a request to download the second-language subtitle medium file or the second-language audio medium file to the CDN server 310 (the request carries the download URL of the second-language subtitle medium file or the download URL of the second-language audio medium file).

In some embodiments, after the terminal 330 sends the request to download the second-language subtitle medium file or the second-language audio medium file to the CDN server 310, the terminal 330 sends the download URL of the second-language subtitle medium file or the download URL of the second-language audio medium file to the CDN server 310.

It should be noted that the foregoing embodiments are merely used to explain this application and shall not constitute a limitation.

The CDN server 310 receives the download request.

S511: The CDN server 310 obtains the second-language subtitle medium file based on the download URL of the second-language subtitle medium file or obtains the second-language audio medium file based on the download URL of the second-language audio medium file.

S512: The CDN server 310 sends the second-language subtitle medium file or the second-language audio medium file to the terminal 330 in real time.

After sending the third index file to the terminal, the CDN server 310 receives a second obtaining request sent by the terminal 330 based on the download URL of the second-language subtitle medium file or the download URL of the second-language audio medium file in the third index file. The second obtaining request is used by the CDN server 310 to obtain the second-language subtitle medium file based on the download URL of the second-language subtitle medium file or obtain the second-language audio medium file based on the download URL of the second-language audio medium file. That is, the second obtaining request is used to switch to subtitles or audio in another language.

S513: The terminal 330 displays the second-language subtitles or the second-language audio of the target video.

The terminal 330 switches the first-language subtitles displayed by the first video application to the second-language subtitles based on the second-language subtitle medium file in response to the request to switch to the second-language subtitles.

Alternatively, the terminal 330 switches the first-language audio displayed by the first video application to the second-language audio based on the second-language audio medium file in response to the request to switch to the second-language subtitles.

It should be noted that the foregoing embodiments are merely used to explain this application and shall not constitute a limitation.

For example, the first video application installed on the terminal 330 is playing a video "Brave step", and the first video application displays the Chinese subtitles and Chinese audio of the target video. In this case, the user wants to switch the Chinese subtitles of the target video to English subtitles. FIG. 6A to FIG. 6D are diagrams of UIs in which the user switches the Chinese subtitles of the target video to the English subtitles.

Figure 6A:
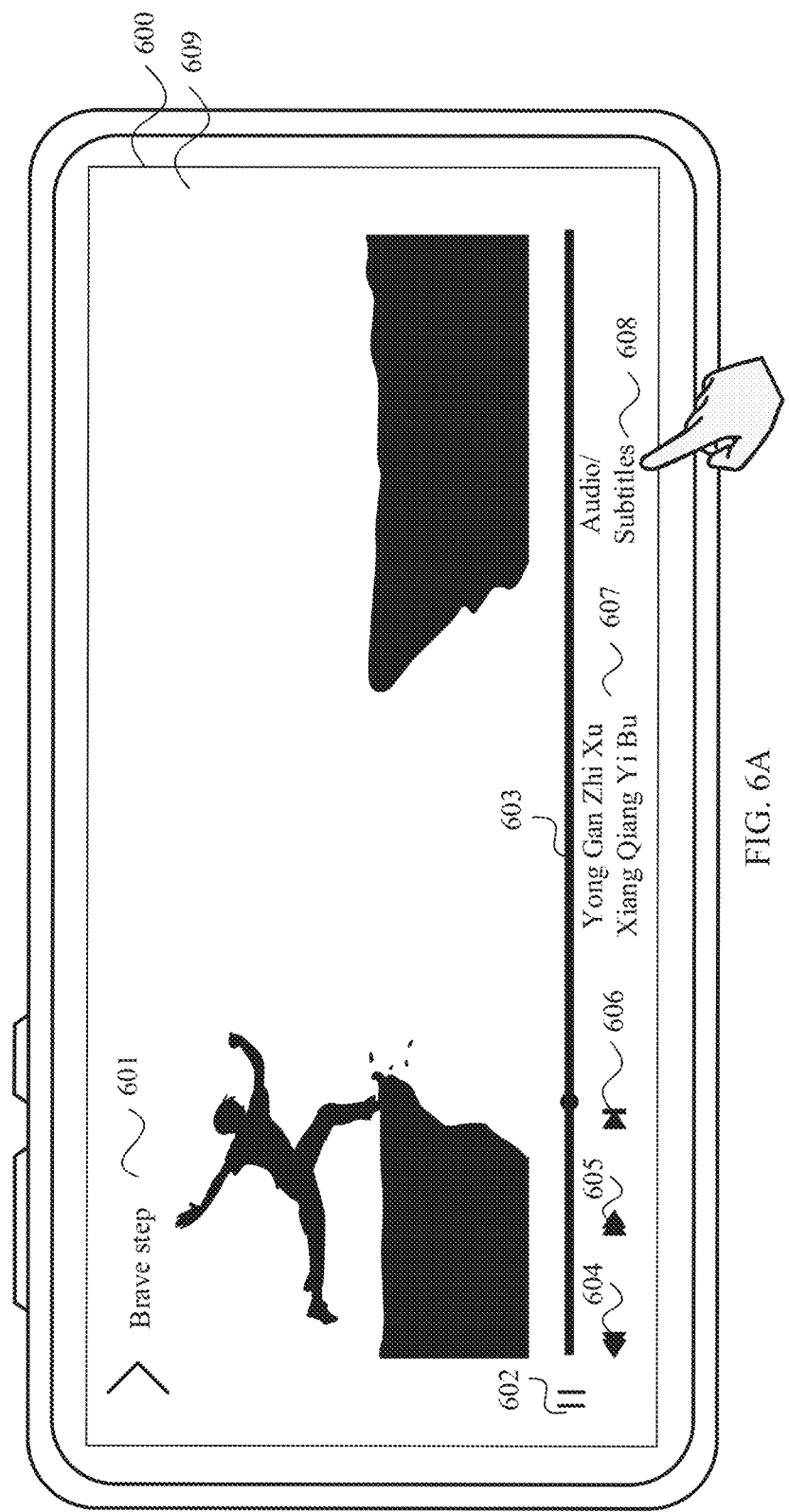
FIG. 6A to FIG. 6D are diagrams of UIs of switching Chinese subtitles of a target video to English subtitles according to an embodiment of this application.

FIG. 6A is a diagram of a user interface 600 in which the first video application plays the video "Brave step".

The user interface 600 includes a video name 601, a start/pause control 602, a playing progress bar 603, a backward control 604, a forward control 605, a next video playing control 606, a subtitle prompt bar 607, an audio/subtitle selection control 608, and a video image 609 at a specific moment.

The video name 601 includes "Brave step".

The start/pause control 602 displays a playing start state. The start/pause control 602 may receive a tap by the user, and then the video is paused.

The playing progress bar 603 displays duration of the video that has been played.

The subtitle prompt bar 607 displays the Chinese subtitles of the target video. The subtitle prompt bar 607 includes a subtitle "Yong Gan Zhi Xu Xiang Qian Yi Bu".

It can be understood that when the start/pause control 602 displays the playing start state, the playing progress bar 603 continuously changes with the playing of the target video, subtitle information of the target video displayed by the subtitle prompt bar 607 also continuously changes with the playing of the target video, and the video image 609 at the specific moment also continuously changes with the playing of the target video.

Figure 6B:
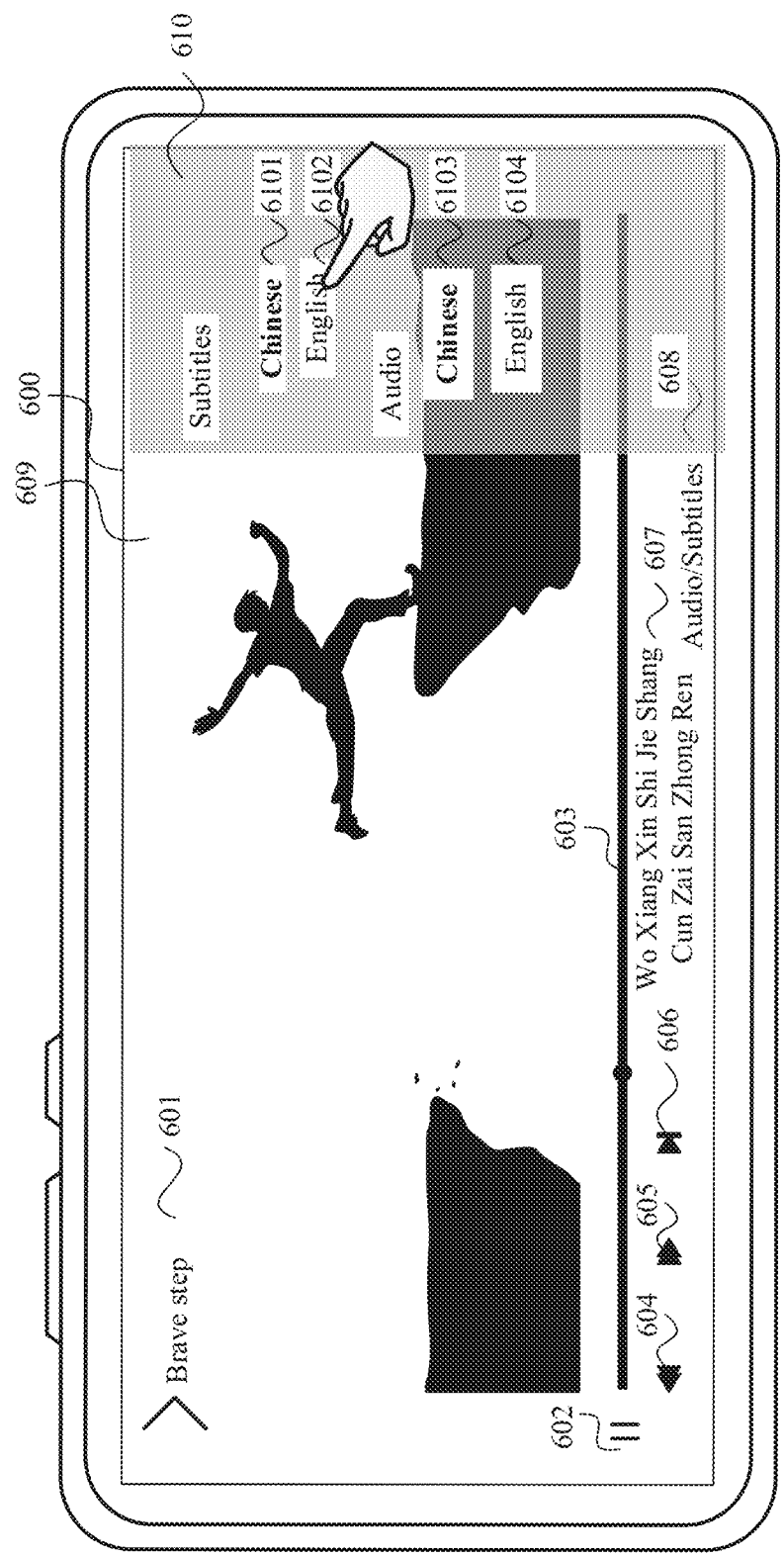

The audio/subtitle selection control 608 may receive the tap by the user, and the first video application displays the user interface 600 shown in FIG. 6B in response to the tap by the user. The user interface 600 further includes a prompt box 610. The prompt box 610 includes a subtitle language option and an audio language option. The subtitle language option includes a Chinese subtitle selection control 6101 and an English subtitle selection control 6102. The audio language option includes a Chinese audio selection control 6103 and an English audio selection control 6104.

It can be understood that the first video application displays the Chinese subtitles and the Chinese audio of the target video. Therefore, both the Chinese subtitle selection control 6101 in the subtitle language option in the prompt box 610 and the Chinese audio selection control 6103 in the audio language option are displayed in bold. Alternatively, the Chinese subtitle selection control 6101 in the subtitle language option in the prompt box 610 and the Chinese audio selection control 6103 in the audio language option are displayed in another color (for example, blue). This is not limited in this application.

The Chinese subtitle selection control 6101 and the English subtitle selection control 6102 may receive a tap operation by the user. The first video application switches, in response to the tap operation by the user, the subtitles in the language displayed in the subtitle prompt bar 607 to the subtitles in the language selected by the user.

The Chinese audio selection control 6103 and the English audio selection control 6104 may receive a tap operation by the user. The first video application switches, in response to the tap operation by the user, the played audio of the target video to the audio in the language selected by the user.

For example, the Chinese subtitles and Chinese audio are displayed for the video "Brave step" played by the first video application. The English subtitle selection control 6102 may receive a tap operation by the user, and the displayed Chinese subtitles are switched to the English subtitles for the video "Brave step" played by the first video application.

The Chinese subtitles and Chinese audio are displayed for the video "Brave step" played by the first video application. The English audio selection control 6104 may receive a tap operation by the user, and the played Chinese audio is switched to the English audio for the video "Brave step" played by the first video application in response to the tap operation by the user.

Figure 6C:
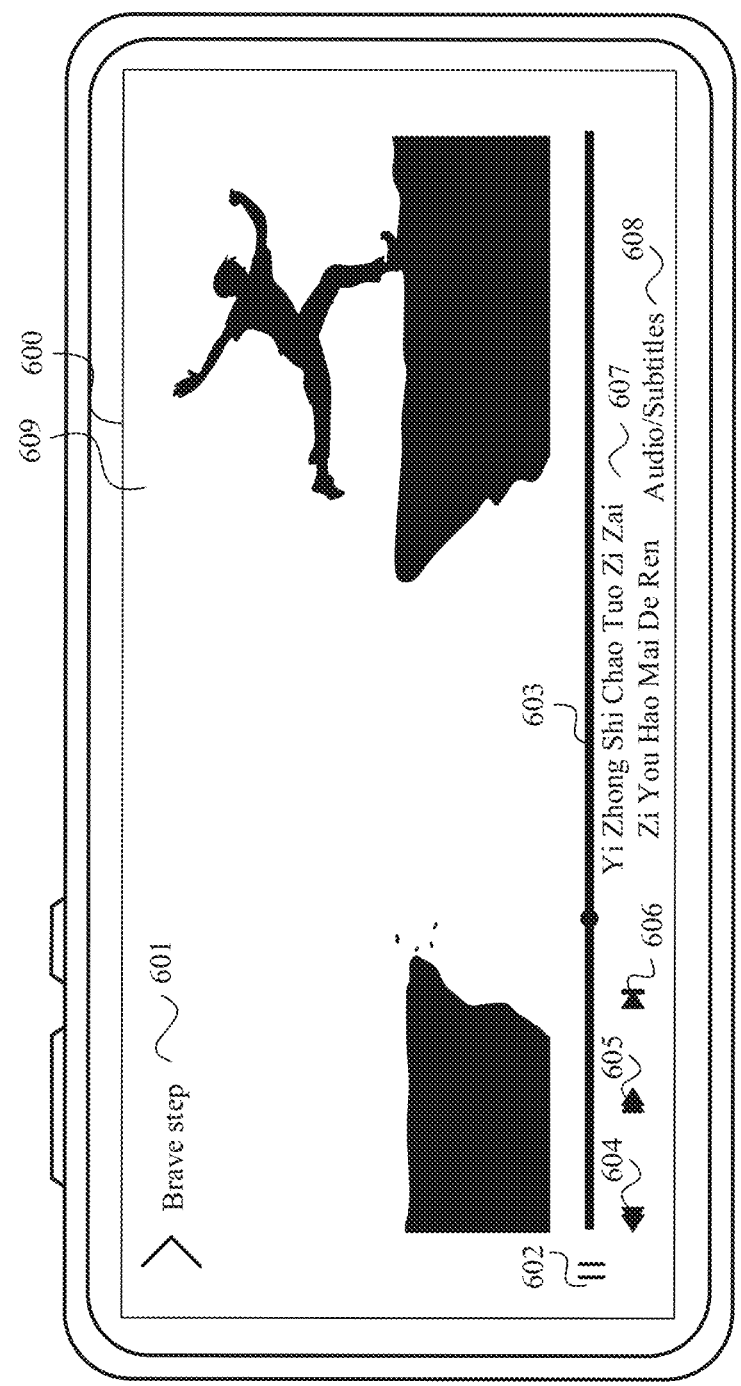
Figure 6D:
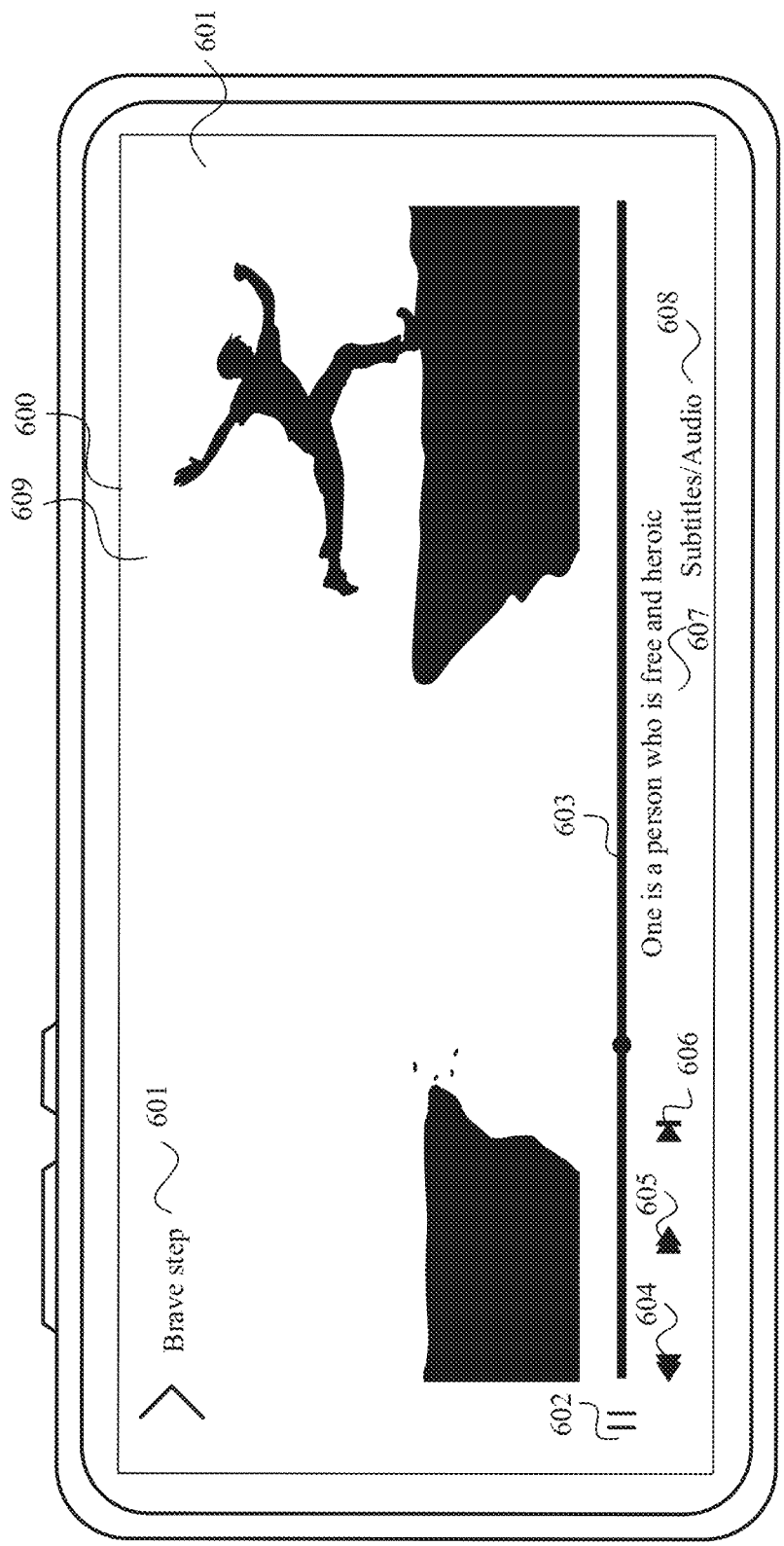

FIG. 6C and FIG. 6D are diagrams of UIs in which a language of the subtitles displayed in the subtitle prompt bar 607 in the first video application is switched from Chinese to English.

FIG. 6C is a diagram of a UI in which the first video application is switching the Chinese subtitles of the video content to the English subtitles. FIG. 6C shows the user interface 600. The subtitle prompt bar 607 in the user interface 600 displays the Chinese subtitles. Subtitle content in the subtitle prompt bar 607 is "Yi Zhong Shi Chao Tuo Zi Zai Zi You Hao Mai De Ren".

FIG. 6D is a diagram of a UI in which the first video application has switched the Chinese subtitles of the video content to the English subtitles. FIG. 6D shows the user interface 600. The subtitle prompt bar 607 in the user interface 600 displays the English subtitles. Subtitle content in the subtitle prompt bar 607 is "One is a person who is free and heroic".

Figure 7:
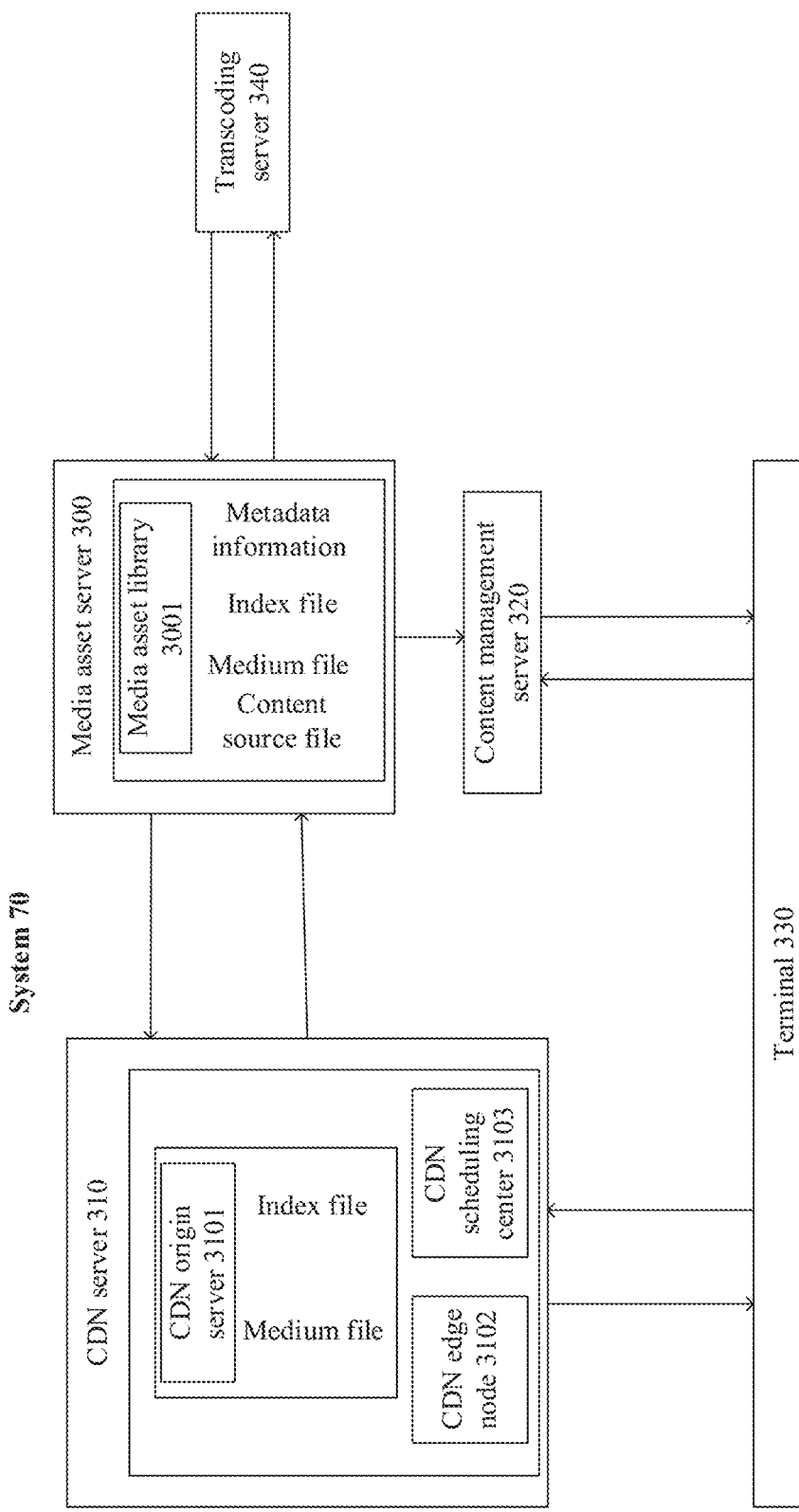
FIG. 7 is a framework diagram of another system of a method for adding subtitles and/or audio according to an embodiment of this application.

FIG. 7 is a framework diagram of a system of a method for adding subtitles and/or audio according to another embodiment of this application. As shown in FIG. 7, a system 70 includes a media asset server 300, a CDN server 310, a content management server 320, a terminal 330, and a transcoding server 340.

For descriptions of the media asset server 300, the CDN server 310, the content management server 320, and the terminal 330 that are included in the system shown in FIG. 7, references may be made to the embodiment in FIG. 3, and details are not described herein again.

The transcoding server 340 may be configured to transcode a content source file of a video into a type of file that can be played by a video application installed on the terminal 330; and further configured to receive new-language subtitles or new-language audio and an index file sent by the media asset server 300, perform format conversion on the new-language subtitles or the new-language audio, update the index file, and finally send a new-language subtitle medium file or a new-language audio medium file and an updated index file to the media asset server 300.

In some embodiments, the media asset server 300, the CDN server 310, the content management server 320, and the transcoding server 340 may all be independently located on one physical device, or any two or more of the servers may be integrated on a same physical device.

It should be noted that the system 30 is merely used to explain this application and shall not constitute a limitation.

Figure 8A:
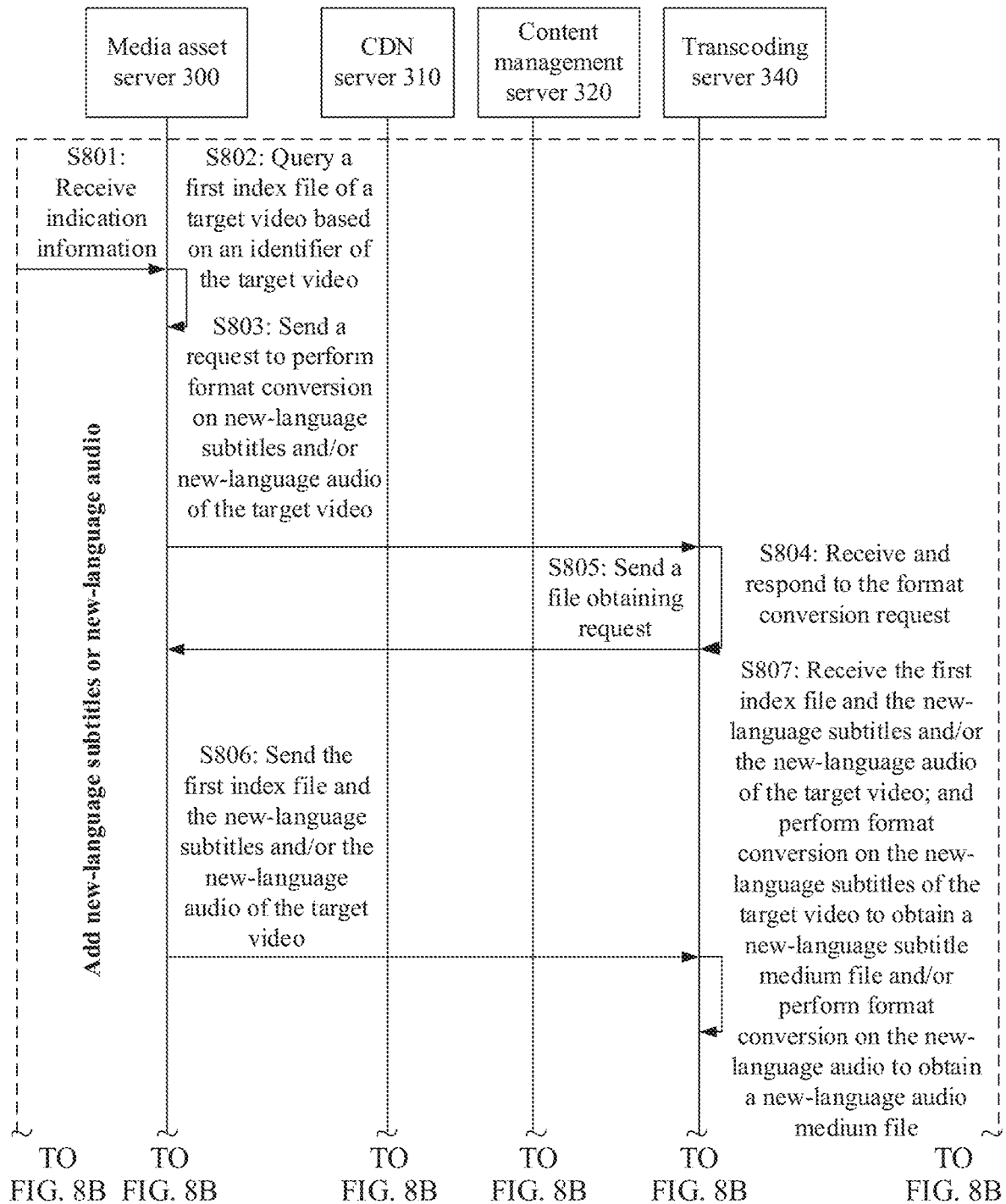
FIG. 8A to FIG. 8C are a flowchart of another method for adding subtitles and/or audio according to an embodiment of this application.
Figure 8B:
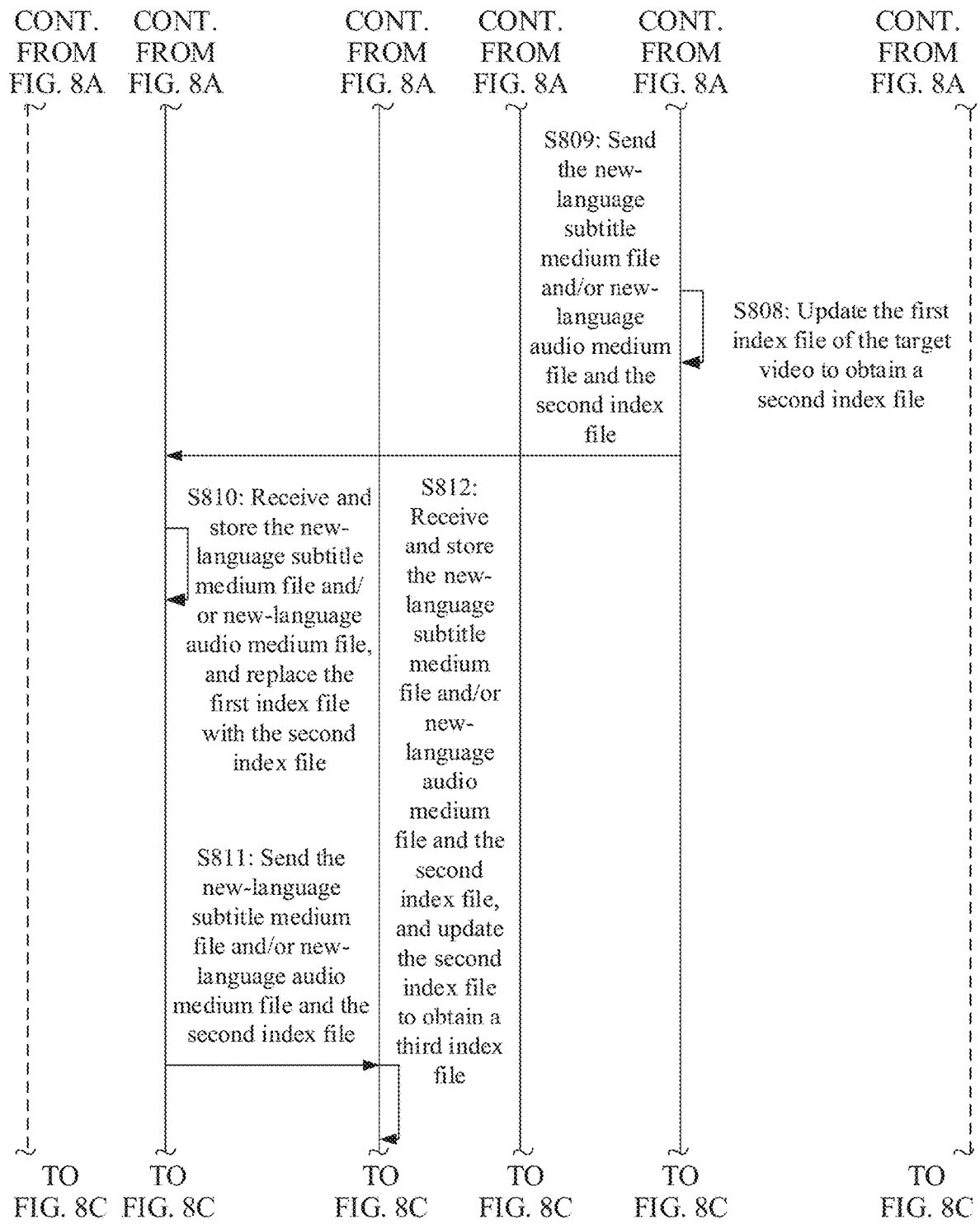
Figure 8C:
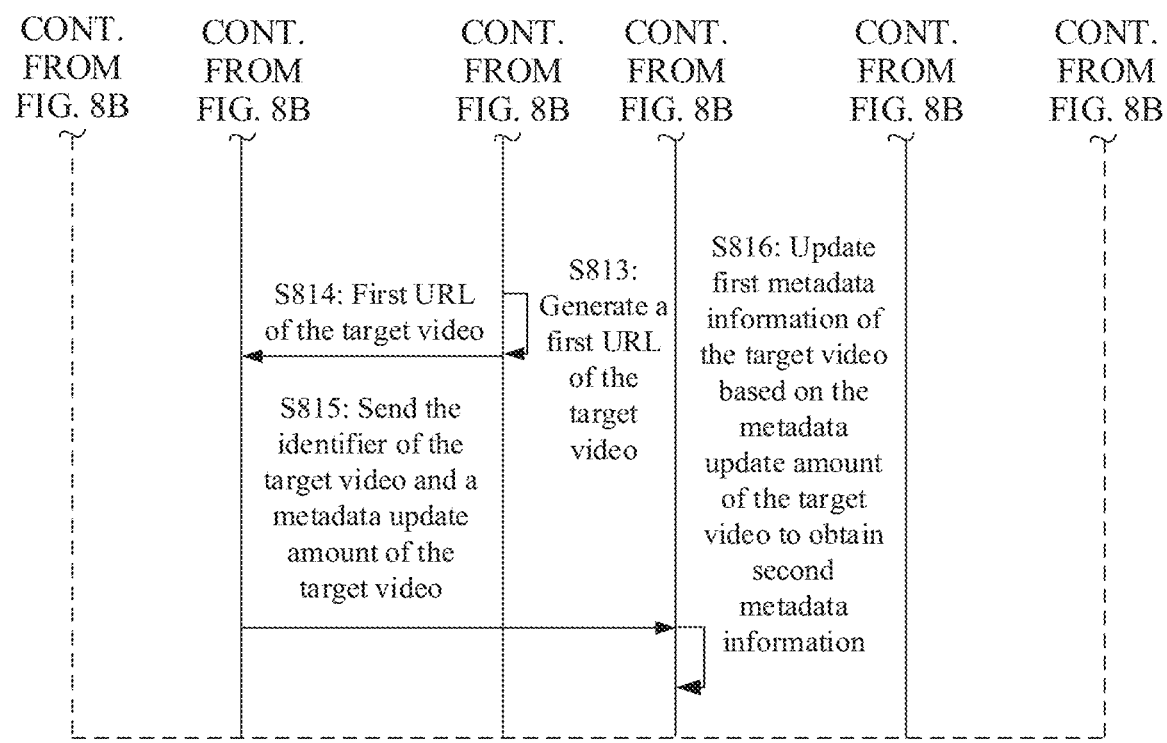

FIG. 8A to FIG. 8C are a flowchart of a method for adding subtitles and/or audio according to another embodiment of this application. The method may be applied to the system

70 shown in FIG. 7. The system 70 may include the media asset server 300, the CDN server 310, the content management server 320, the terminal 330, and the transcoding server 340.

For a specific description of the system 70, references may be made to the embodiment shown in FIG. 7, and details are not described herein again. The method may include:

S801: The media asset server 60 receives indication information (including a subtitle adding instruction, an identifier of a target video, and new-language subtitles of the target video; and/or an audio adding instruction, the identifier of the target video, and new-language audio of the target video).

S802: The media asset server 60 queries a first index file of the target video based on the identifier of the target video.

For specific descriptions of S801 and S802, references may be made to S401 and S402 in the embodiment shown in FIG. 4, and details are not described herein again.

S803: The media asset server 300 sends a request to perform format conversion on the new-language subtitles or new-language audio of the target video to the transcoding server 340.

S804: The transcoding server 340 receives and responds to the format conversion request.

S805: The transcoding server 340 sends a file obtaining request to the media asset server 300.

S806: The media asset server 300 sends the new-language subtitles and/or new-language audio and the first index file of the target video to the transcoding server 340.

In some embodiments. S803, S804, S805, and S806 may alternatively be replaced by "S803: The media asset server 300 sends a format conversion request message for the new-language subtitles or new-language audio of the target video to the transcoding server 340, where the request message includes the new-language subtitles and/or new-language audio of the target video, and the first index file of the target video". An example in which the new-language subtitles and/or new-language audio of the target video and the first index file of the target video are all carried in the same message (specifically, the request message) for sending is used for description. It may be extended that any two of these files may be carried in the same message for sending, or may be carried in different messages for sending. If the files are carried in different messages for sending, the different messages may or may not be sent simultaneously.

In some embodiments, S806 may alternatively be replaced by "S806: The media asset server 300 sends a download address of the new-language subtitles or new-language audio of the target video and a download address of the first index file of the target video to the transcoding server 340". The transcoding server 340 receives the download address of the new-language subtitles and/or new-language audio of the target video and the download address of the first index file of the target video sent by the media asset server 300. The transcoding server 340 obtains the new-language subtitles and/or new-language audio of the target video and the first index file of the target video based on the download address of the new-language subtitles and/or new-language audio of the target video and the download address of the first index file of the target video.

S807: The transcoding server 340 receives the first index file, and the new-language subtitles and/or new-language audio of the target video; and performs format conversion on the new-language subtitles of the target video to obtain the new-language subtitle medium file and/or performs format conversion on the new-language audio to obtain the new-language audio medium file.

The media asset server 300 performs format conversion on the new-language subtitles of the target video to obtain the new-language subtitle medium file and/or performs format conversion on the new-language audio to obtain the new-language audio medium file.

Herein, the format conversion is to convert the new-language subtitles and/or the new-language audio of the target video into a file format that can be recognized and played by the video application, for example, the new-language subtitle medium file and/or the new-language audio medium file encapsulated in an MP4 file format.

S808: The transcoding server 340 updates the first index file of the target video (including adding description information of the new-language subtitle medium file and/or description information of the new-language audio medium file to the first index file) to obtain a second index file.

The description information of the new-language subtitle medium file and/or the description information of the new-language audio medium file may include an identifier of the new-language subtitle medium file (for example, French subtitles) and/or an identifier of the new-language audio medium file (for example, French audio), an encoding format of the new-language subtitle medium file and/or an encoding format of the new-language audio medium file, a first URL of the new-language subtitle medium file and/or a first URL of the new-language audio medium file, and the like.

The media asset server 300 adds the description information of the new-language subtitles and/or the description information of the new-language audio to the first index file to update the first index file. For ease of description, an updated first index file is referred to as the second index file.

S809: The transcoding server 340 sends the new-language subtitle medium file and/or new-language audio medium file and the second index file to the media asset server 300.

S810: The media asset server 300 receives and stores the new-language subtitle medium file and/or new-language audio medium file of the target video, and replaces the first index file of the target video with the second index file.

In some embodiments, S806, S807, S808, S809, and S810 may be replaced by "S806: The media asset server 300 sends the new-language subtitles and/or new-language audio of the target video to the transcoding server 340". S807: The transcoding server 340 receives the new-language subtitles and/or new-language audio of the target video; and performs format conversion on the new-language subtitles of the target video to obtain the new-language subtitle medium/or performs format conversion on the new-language audio to obtain the new-language audio medium file. S808: The transcoding server 340 sends the new-language subtitle medium file and/or new-language audio medium file to the media asset server 300. S809: The media asset server 300 updates the first index file (including adding the description information of the new-language subtitle medium file and/or description information of the new-language audio medium file to the first index file) to obtain the second index file". In this way, the media asset server 300 does not need to send the first index file of the target video to the transcoding server 340, and the media asset server 300 updates the first index file of the target video to obtain the second index file. This can reduce file transmission between the media asset server 300 and the transcoding server 340 and reduce network transmission resources.

S811: The media asset server 300 sends the new-language subtitle medium file and/or the new-language audio medium file and the second index file to the CDN server 310.

S812: The CDN server 310 receives and stores the new-language subtitle medium file and/or the new-language audio medium file and the second index file, and updates the second index file (changes the first URL of the new-language subtitle medium file to a second URL of the new-language subtitle medium file and/or changes the first URL of the new-language audio medium file to a second URL of the new-language audio medium file) to obtain a third index file.

S813: The CDN server 310 generates a first URL of the target video (including a download address of the third index file and security verification information for preventing playing through hotlinking).

S814: The CDN server 310 sends the first URL of the target video to the media asset server 300.

S815: The media asset server 300 sends the identifier of the target video and a metadata information update amount of the target video to the content management server 320.

S816: The content management server 320 updates metadata information of the video based on the identifier of the target video and the metadata information update amount of the target video.

For specific descriptions of S811, S812, S813, S814, S815, and S816, references may be made to S405, S406, S307, S408, S409, and S410 in the embodiment shown in FIG. 4, and details are not described herein again.

In this embodiment, the transcoding server 340 performs format conversion on the new-language subtitles and/or new-language audio of the target video to obtain the new-language subtitle medium file and/or new-language audio medium file of the target video. In this way, conversion efficiency can be improved.

The foregoing embodiments are merely intended for describing the technical solutions of this application instead of limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A system comprising:
a media asset server configured to:
receive a first identifier and a new-language file of a target video, wherein the new-language file comprises to-be-added subtitles of the target video or to-be-added audio of the target video;
obtain a first index file of the target video based on the first identifier, wherein the first index file comprises a first uniform resource locator (URL) of an existing-language medium file of the target video, and wherein the first URL indicates a first storage address of the existing-language medium file on the media asset server;
perform format conversion on the new-language file to obtain a new-language medium file;
obtaining a second index file based on adding a second URL of the new-language medium file to the first index file, wherein the second URL indicates a second storage address of the new-language medium file on the media asset server; and
send the new-language medium file and the second index file; and
a content delivery server coupled to the media asset server, wherein the content delivery server is configured to:
receive the new-language medium file and the second index file from the media asset server;
obtain a third index file based on the second index file and a third URL of the new-language medium file, wherein the third URL indicates a third storage address of the new-language medium file on the content delivery server; and
send the third index file to a terminal.

2. The system according to claim 1, wherein the media asset server is further configured to:
send the new-language file to a transcoding server; and
receive, from the transcoding server, the new-language medium file to perform the format conversion of the new-language file.

3. The system according to claim 1, wherein the media asset server is further configured to:
receive a fourth URL of the target video from the content delivery server, wherein the first fourth URL indicates a fourth storage address of the third index file on the content delivery server; and
send the first identifier and the first fourth URL to a content management server to obtain first metadata information of the target video, wherein the first metadata information comprises a fifth URL of the target video that indicates a fifth storage address of the first index file on the content delivery server to replace the fifth URL with the fourth URL to obtain second metadata information.

4. The system according to claim 1, wherein the content delivery server is further configured to:
receive, before sending the third index file to the terminal, a first obtaining request from the terminal for an available URL of the target video; and
send the third index file to the terminal in response to the first obtaining request.

5. The system according to claim 4, wherein the content delivery server is further configured to:
receive, after sending the third index file to the terminal, a second obtaining request from the terminal, wherein the second obtaining request is based on the second URL of the new-language medium file in the third index file; and
send the new-language medium file to the terminal in response to the second obtaining request.

6. The system according to claim 1, wherein the first index file further comprises a second identifier of both the new-language medium file and an encoding format of the new-language medium file.

7. The system according to claim 1, wherein the media asset server is further configured to:
send the first index file to a transcoding server; and
receive the second index file from the transcoding server, wherein the second index file includes the second URL.

8. The system according to claim 7, wherein the second index file from the transcoding server is based on adding the second URL to the first index file.

9. A media asset server comprising:
a memory configured to store instructions; and
a processor coupled to the memory and configured to execute the instructions to cause the media asset server to:
receive a first identifier and a new-language file of a target video, wherein the new-language file comprises to-be-added subtitles of the target video or to-be-added audio of the target video;
obtain a first index file of the target video based on the first identifier, wherein the first index file comprises a first uniform resource locator (URL) of an existing-language medium file of the target video, and wherein the first URL indicates a first storage address of the existing-language medium file on the media asset server;
perform format conversion on the new-language file to obtain a new-language medium file;
add a second URL of the new-language medium file to the first index file to obtain a second index file, wherein the second URL indicates a second storage address of the new-language medium file on the media asset server;
send the new-language medium file and the second index file to a content delivery server; and
receive a third index file from the content delivery server, wherein the third index file is based on the second index file and a third URL of the new-language medium file, and wherein the third URL indicates a third storage address of the new-language medium file on the content delivery server.

10. The media asset server according to claim 9, wherein the processor is further configured to invoke execute the computer instructions to enable cause the media asset server to:
send the new-language file to a transcoding server; and
receive, from the transcoding server, the new-language medium file to perform the format conversion of the new-language file.

11. The media asset server according to claim 9, wherein the processor is further configured to execute the instructions to cause the media asset server to:
send the second index file to a transcoding server; and
receive the second index file from the transcoding server, wherein the second index file includes the second URL.

12. The media asset server according to claim 9, wherein the processor is further configured to execute the instructions to cause the media asset server to:
receive a third URL of the target video from the content delivery server, wherein the third URL indicates a third storage address of a third index file on the content delivery server; and
send the first identifier and the third URL to a content management server to obtain first metadata information of the target video, wherein the first metadata information comprises a fourth URL of the target video that indicates a fourth storage address of the first index file on the content delivery server to replace the fourth URL with the third URL to enable the content management server to obtain second metadata information.

13. The media asset server according to claim 9, wherein the first index file further comprises a second identifier of both the new-language medium file and an encoding format of the new-language medium file.

14. A method, implemented by a media asset server and comprising:
receiving a first identifier and a new-language file of a target video, wherein the new-language file comprises to-be-added subtitles of the target video or to-be-added audio of the target video;
obtaining a first index file of the target video based on the first identifier, wherein the first index file comprises a first uniform resource locator (URL) of an existing-language medium file of the target video, and wherein the first URL indicates a first storage address of the existing-language medium file on the media asset server;
performing format conversion on the new-language file to obtain a new-language medium file;
adding a second URL of the new-language medium file to the first index file to obtain a second index file, wherein the second URL indicates a second storage address of the new-language medium file on the media asset server;
sending the new-language medium file and the second index file to a content delivery server; and
receiving a third index file from the content delivery server, wherein the third index file is based on the second index file and a third URL of the new-language medium file, and wherein the third URL indicates a third storage address of the new-language medium file on the content delivery server.

15. The method according to claim 14, further comprising:
sending the new-language file to a transcoding server; and
receiving the new-language medium file from the transcoding server to perform the format conversion of new-language file.

16. The method according to claim 14, further comprising:
sending the first index file to a transcoding server; and
receiving, the second index file from the transcoding server, wherein the second index file includes the second URL.

17. The method according to claim 14, further comprising:
receiving a third URL of the target video from the content delivery server, wherein the third URL indicates a third storage address of a third index file on the content delivery server; and
sending the first identifier and the second URL to a content management server to obtain first metadata information of the target video, wherein the first metadata information comprises a fourth URL of the target video that indicates a fourth storage address of the first index file on the content delivery server to replace the fourth URL with the third URL to obtain second metadata information.

18. The method according to claim 14, wherein the first index file further comprises a second identifier of the new-language medium file and an encoding format of the new-language medium file.

* * * * *

UNITED STATES PATENT AND TRADEMARK OFFICE
CERTIFICATE OF CORRECTION

| | |
|---|---|
| PATENT NO. | : 11,943,492 B2 |
| APPLICATION NO. | : 18/005769 |
| DATED | : March 26, 2024 |
| INVENTOR(S) | : Wei Yan |

It is certified that error appears in the above-identified patent and that said Letters Patent is hereby corrected as shown below:

In the Claims

Claim 10, Column 35, Line 32: "configured to invoke execute the" should read "configured to execute the"

Claim 10, Column 35, Line 33: "computer instructions to" should read "instructions to"

Signed and Sealed this
Thirtieth Day of April, 2024

Katherine Kelly Vidal
*Director of the United States Patent and Trademark Office*